(12) United States Patent
Benisty et al.

(10) Patent No.: US 11,636,153 B2
(45) Date of Patent: *Apr. 25, 2023

(54) STORAGE OF TREE DATA STRUCTURES

(71) Applicant: Western Digital Technologies, Inc., San Jose, CA (US)

(72) Inventors: Shay Benisty, Beer Sheva (IL); Ishai Ilani, Dolev (IL); Tomer Geron, Tel Aviv (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,986

(22) Filed: May 27, 2021

(65) Prior Publication Data

US 2022/0391449 A1    Dec. 8, 2022

(51) Int. Cl.
*G06F 12/0817* (2016.01)
*G06F 3/06* (2006.01)
*G06F 16/901* (2019.01)

(52) U.S. Cl.
CPC .......... *G06F 16/9027* (2019.01); *G06F 3/061* (2013.01); *G06F 12/0824* (2013.01)

(58) Field of Classification Search
CPC ........ G06F 3/061; G06F 3/0611; G06F 3/062; G06F 3/0638; G06F 3/0604; G06F 3/0673

See application file for complete search history.

(56) References Cited

U.S. PATENT DOCUMENTS

| | | | |
|---|---|---|---|
| 6,567,815 B1* | 5/2003 | Rubin | G06F 16/9027 |
| 7,251,663 B1 | 7/2007 | Smith | |
| 10,216,627 B1* | 2/2019 | Givargis | G06F 12/0897 |
| 2007/0112795 A1* | 5/2007 | Travison, Jr. | G06F 16/2255 |
| 2008/0201340 A1 | 8/2008 | Thonangi | |
| 2015/0186550 A1* | 7/2015 | Marathe | G06F 16/9027 |
| | | | 707/797 |
| 2017/0206231 A1 | 7/2017 | Binder et al. | |
| 2020/0065256 A1* | 2/2020 | Palmer | G06F 16/2246 |

(Continued)

OTHER PUBLICATIONS

Gassend, B., G. E. Suh, D. Clarke, M. Van Dijk, and S. Devadas. "Caches and hash trees for efficient memory integrity verification." In The Ninth International Symposium on High-Performance Computer Architecture, 2003. HPCA-9 2003. Proceedings., pp. 295-306. IEEE, 2003.*

(Continued)

Primary Examiner — Tracy A Warren
(74) Attorney, Agent, or Firm — Patent Law Works LLP

(57) ABSTRACT

Disclosed herein is a computer-implemented method for storing binary tree data in memory. The binary tree data comprises parent node data, first child node data and second child node data. The computer-implemented method comprises determining a first child node memory address, the first child node memory address being less than a parent node memory address; determining a second child node memory address, the second child node memory address being greater than the parent node memory address; storing the parent node data at the parent node memory address; storing the first child node data at the first child node memory address; and storing the second child node data at the second child node memory address.

20 Claims, 11 Drawing Sheets

(56) References Cited

U.S. PATENT DOCUMENTS

2021/0200734 A1* 7/2021 Sahi .................... G06F 16/2237
2021/0311640 A1 10/2021 Elad et al.

OTHER PUBLICATIONS

Elbaz, R., D. Champagne, R. B. Lee, L. Torres, G. Sassatelli, and P. Guillemin. "Tec-tree: A low-cost, parallelizable tree for efficient defense against memory replay attacks." In International Workshop on Cryptographic Hardware and Embedded Systems, pp. 289-302. Springer, Berlin, Heidelberg, 2007.*

Zou, Y., and M. Lin. "Fast: A frequency-aware skewed Merkle tree for FPGA-secured embedded systems." In 2019 IEEE Computer Society Annual Symposium on VLSI (ISVLSI), pp. 326-331. IEEE, 2019.*

Jeff Tyson & Chris Pollette "How RAM Works" Aug. 25, 2000. HowStuffWorks.com. <https://computer.howstuffworks.com/ram.htm> Sep. 25, 2022.*

T. H. Cormen, C. E. Leiserson, R. L. Rivest, C. Stein, "Introduction to Algorithms", Third Edition, ISBN 978-0-262-03384-8 (hardcover: alk. paper), accessed on Sep. 4, 2020.

"Binary tree", Wikipedia https://en.wikipedia.org/wiki/Binary_tree, edited date Jul. 20, 2021, [retrieved on Aug. 13, 2021], 8 pages.

"Merkle tree", Wikipedia https://en.wikipedia.org/wiki/Merkle_tree, edited date Aug. 11, 2021, [retrieved on Aug. 13, 2021], 5 pages.

"Tree Structure," Wikipedia, 2004, retrieved from https://en.wikipedia.org/wiki/Tree_structure#:~:text=A node's 'uncles-"(sometimes,descendants" of the ancestor node. on May 16, 2022, 6 pgs.

"Tree Traversal," Wikibooks, 2016, retrieved from https://en.wikibooks.org/wiki/A-level_Computing/AQA/Paper_1/Fundamentals_of_algorithms/Tree-traversal#:~text=An%20in%2Dorder%20traversal%2C%20because,does%20the%20following%20code%20do%3F&text=value>%20end%20sub-,Answer%3A,subtree%20and%20finally%20the%20node on Jun. 2, 2022, 8 pgs.

* cited by examiner

STORAGE OF TREE DATA STRUCTURES

TECHNICAL FIELD

The present technology relates to the field of data storage, and in particular, to storing binary tree data.

BACKGROUND

The host memory buffer (HMB) feature of a data storage device enables a controller of the data storage device to utilize a designated portion of a host memory (the host memory buffer) of a host device to store data. The designated portion of the host memory is allocated to the controller of the data storage device. The controller may be responsible for initializing the host memory resources. By using the HMB, the required size of dynamic random access memory (DRAM) of the data storage device may be reduced and the cost of the data storage device may be reduced.

Utilizing the host memory buffer requires read and write commands to be communicated between the data storage device and the HMB via a communications bus. A system utilizing this configuration therefore has an additional latency associated with communicating over the communications bus. This problem can be further compounded if the data is stored in an inefficient manner that requires numerous read and write commands to be performed to read and/or amend the data stored in the HMB.

Furthermore, because the HMB is an external memory to the data storage device, the data storage device may be subjected to security attacks, such as network attacks including replay attacks and/or playback attacks, by attacking the host DRAM, specifically, the HMB. A replay attack and/or playback attack is a form of network attack in which a valid data transmission is maliciously or fraudulently repeated or delayed. The replay attack and/or playback attack may either be carried out by an originator or by an adversary who intercepts the data and re-transmits it. The replay attack and/or playback attack may be part of a masquerade attack by IP packet substitution.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Disclosed herein is a computer-implemented method for storing binary tree data in memory. The binary tree data comprises parent node data, first child node data and second child node data. The computer implemented method comprises determining a first child node memory address, the first child node memory address being less than a parent node memory address; and determining a second child node memory address, the second child node memory address being greater than the parent node memory address. The computer-implemented method comprises storing the parent node data at the parent node memory address; storing the first child node data at the first child node memory address; and storing the second child node data at the second child node memory address.

In some embodiments, the parent node memory address is between the first child node memory address and the second child node memory address.

In some embodiments, the computer-implemented method comprises determining the parent node memory address.

In some embodiments, the first child node memory address and the second child node memory address are determined based at least in part on the parent node memory address.

In some embodiments, storing the parent node data at the parent node memory address comprises storing a part of the parent node data at the parent node memory address.

In some embodiments, storing the first child node data at the first child node memory address comprises storing a part of the first child node data at the first child node memory address.

In some embodiments, storing the second child node data at the second child node memory address comprises storing a part of the second child node data at the second child node memory address.

In some embodiments, the parent node data comprises data associated with a first level of a binary tree.

In some embodiments, the first child node data comprises data associated with a second level of the binary tree.

In some embodiments, the second child node data comprises data associated with the second level of the binary tree.

In some embodiments, storing the parent node data at the parent node memory address is performed before storing the first child node data at the first child node memory address.

In some embodiments, storing the parent node data at the parent node memory address is performed before storing the second child node data at the second child node memory address.

In some embodiments, storing the first child node data at the first child node memory address is performed before storing the parent node data at the parent node memory address.

In some embodiments, storing the first child node data at the first child node memory address is performed before storing the second child node data at the second child node memory address.

In some embodiments, storing the second child node data at the second child node memory address is performed before storing the parent node data at the parent node memory address.

In some embodiments, storing the second child node data at the second child node memory address is performed before storing the first child node data at the first child node memory address.

In some embodiments, the binary tree data comprises first child tree data comprising at least the first child node data.

In some embodiments, the binary tree data comprises second child tree data comprising at least the second child node data.

In some embodiments, the computer-implemented method comprises storing the first child tree data at memory addresses within a range of first tree memory addresses that comprises the first child node memory address.

In some embodiments, the memory addresses of the range of first tree memory addresses are less than the parent node memory address.

In some embodiments, the computer-implemented method comprises storing the second child tree data at memory addresses within a range of second tree memory addresses that comprises the second child node memory address.

In some embodiments, the memory addresses of the range of second tree memory addresses are greater than the parent node memory address.

In some embodiments, determining the first child node memory address comprises determining a first child node memory address indicator bt([$i_1$, $i_2$, . . . , $i_{k-1}$, $i_k$]) by calculating:

$$bt([i_1, i_2, \ldots, i_{k-1}, i_k]) = -1 - \sum_{j=0}^{k}(-1)^{i_j}2^{d-j}$$

where:

[$i_1$, $i_2$, ..., $i_{k-1}$, $i_k$] is a node position vector of a first child node that is associated with the first child node data;

$i_1$ is a first layer position of a linked higher level node in a first level of a binary tree;

$i_2$ is second layer position of a linked higher level node in a second level of the binary tree;

$i_{k-1}$ is a (k−1)th layer position of a parent node that is associated with the parent node data, in a (k−1)$^{th}$ level of the binary tree;

$i_k$ is a kth layer position of the first child node in a k$^{th}$ level of the binary tree;

$i_0 = 1$; and d is a depth indicator that is indicative of a depth of the binary tree In some embodiments, the computer-implemented method comprises storing the parent node data at a range of parent node memory addresses that comprises the parent node memory address.

In some embodiments, the computer-implemented method comprises storing the first child node data at a range of first child node memory addresses that comprises the first child node memory address.

In some embodiments, the computer-implemented method comprises storing the second child node data at a range of second child node memory addresses that comprises the second child node memory address.

In some embodiments, memory addresses of the range of first child node memory addresses are less than memory addresses of the range of parent node memory addresses.

In some embodiments, memory addresses of the range of second child node memory addresses are greater than memory addresses of the range of parent node memory addresses.

In some embodiments, the range of first child node memory addresses and the range of parent node memory addresses form a first consecutive range of memory addresses.

In some embodiments, the range of parent node memory addresses and the range of second child node memory addresses form a second consecutive range of memory addresses.

Disclosed herein is an apparatus for storing binary tree data in memory. The binary tree data comprises parent node data, first child node data and second child node data. The apparatus is configured to: determine a first child node memory address, the first child node memory address being less than a parent node memory address; determine a second child node memory address, the second child node memory address being greater than the parent node memory address; store the parent node data at the parent node memory address; store the first child node data at the first child node memory address; and store the second child node data at the second child node memory address.

Disclosed herein is an apparatus for storing binary tree data in memory. The binary tree data comprises parent node data, first child node data and second child node data. The apparatus comprises: means for determining a first child node memory address, the first child node memory address being less than a parent node memory address; means for determining a second child node memory address, the second child node memory address being greater than the parent node memory address; means for storing the parent node data at the parent node memory address; means for storing the first child node data at the first child node memory address; and means for storing the second child node data at the second child node memory address.

Disclosed herein is binary tree data stored in memory. The binary tree data comprises parent node data, first child node data and second child node data. A first child node memory address storing at least a part of the first child node data is less than a parent node memory address storing at least a part of the parent node data. A second child node memory address storing at least a part of the second child node data is greater than the parent node memory address.

In some embodiments, the parent node data comprises data associated with a first level of a binary tree.

In some embodiments, the first child node data comprises data associated with a second level of the binary tree.

In some embodiments, the second child node data comprises data associated with the second level of the binary tree.

In some embodiments, the parent node data is stored at a range of parent node memory addresses that comprises the parent node memory address.

In some embodiments, the first child node data is stored at a range of first child node memory addresses that comprises the first child node memory address.

In some embodiments, the second child node data is stored at a range of second child node memory addresses that comprises the second child node memory address.

In some embodiments, memory addresses of the range of first child node memory addresses are less than memory addresses of the range of parent node memory addresses.

In some embodiments, memory addresses of the range of second child node memory addresses are greater than memory addresses of the range of parent node memory addresses.

In some embodiments, the range of first child node memory addresses and the range of parent node memory addresses form a first consecutive range of memory addresses.

In some embodiments, the range of parent node memory addresses and the range of second child node memory addresses form a second consecutive range of memory addresses.

BRIEF DESCRIPTION OF DRAWINGS

Embodiments of the present disclosure will now be described by way of non-limiting example only, with reference to the accompanying drawings, in which.

DESCRIPTION OF EMBODIMENTS

Described embodiments relate to systems, methods and computer programs for storing binary tree data in memory. In some embodiments, a controller of a data storage device is configured to store node data of nodes of a binary tree in memory such that the node data of a particular node of the binary tree is stored in the memory between the node's two child nodes. Described embodiments also relate to systems, methods and computer programs for storing Merkle tree data in memory. In some embodiments, the controller of the data storage device is configured to store node data of nodes of a Merkle tree in memory such that the node data of a particular node of the Merkle tree is stored in the memory between the node's two nephew nodes.

Storage System 100

Figure 1:
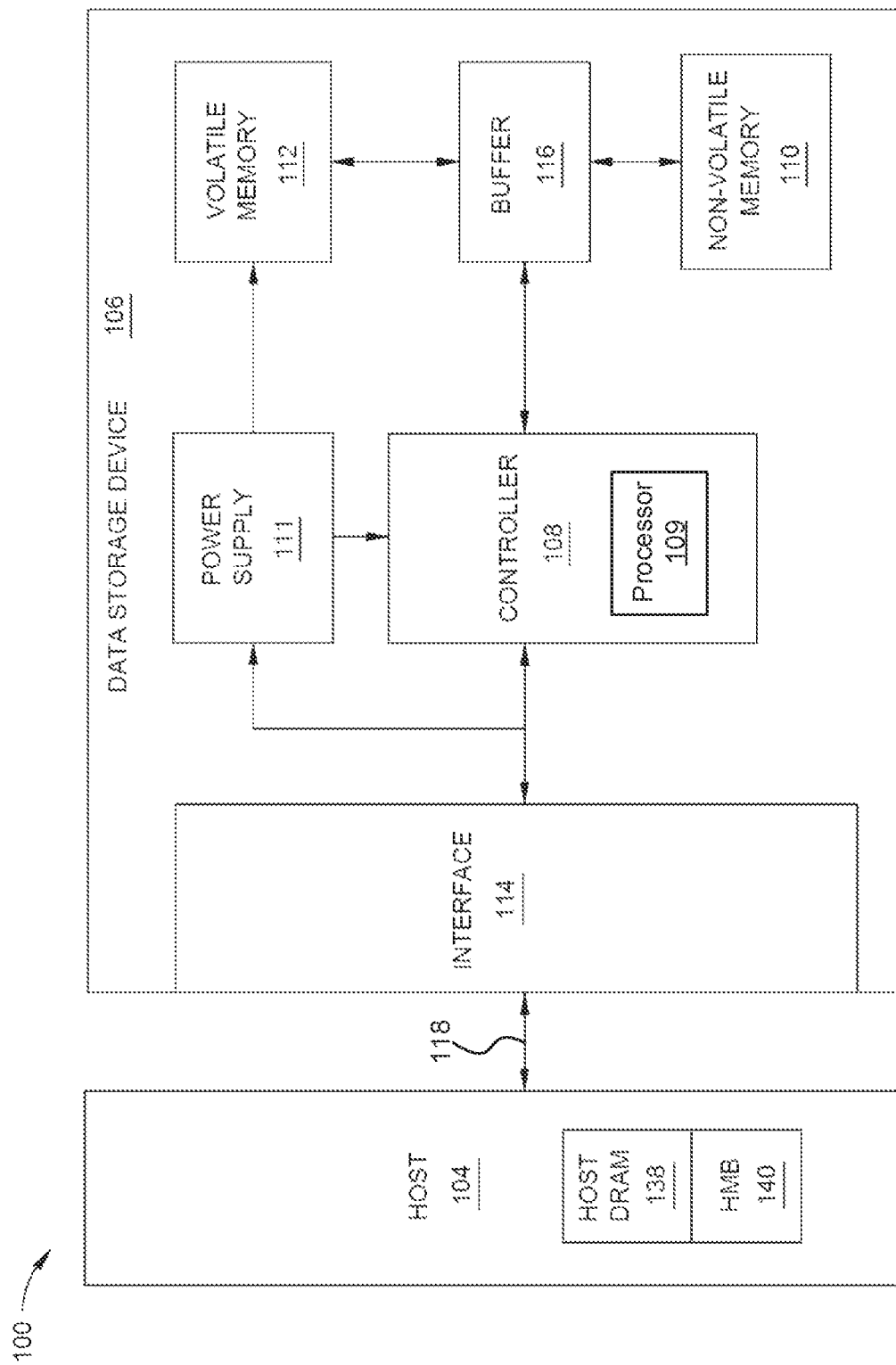
FIG. 1 is a schematic block diagram illustrating a storage system in which a data storage device may function as a storage device for a host device, according to some embodiments.

FIG. 1 is a schematic block diagram illustrating a storage system 100. The storage system 100 comprises a data storage device 106. The storage system 100 comprises a host device 104. The data storage device 106 may function as a storage device for the host device 104.

Data Storage Device 106

The data storage device 106 comprises non-volatile memory (NVM) 110. The host device 104 may utilize the NVM 110 included in data storage device 106 to store and retrieve data. The host device 104 comprises a host dynamic random access memory (DRAM) 138. A portion of the host DRAM 138 is allocated as a host memory buffer (HMB) 140. The HMB 140 may be used by the data storage device 106 as an additional working area or an additional storage area. The HMB 140 may be inaccessible by the host device 104 in some examples. In some examples, the storage system 100 may comprise a plurality of storage devices, such as the data storage device 106. The plurality of storage devices may operate as a storage array. For instance, the storage system 100 may comprise a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 comprises a controller 108. The data storage device 106 comprises the NVM 110 as described herein. The data storage device 106 comprises a power supply 111. The data storage device 106 comprises a volatile memory 112. The data storage device 106 comprises an interface 114. The data storage device 106 comprises a write buffer 116. In some examples, the data storage device 106 may comprise additional components not shown in FIG. 1 for the sake of clarity. For example, the data storage device 106 may comprise a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The data storage device 106 is configured to communicate with the host device 104 using a communications network 118. The interface 114 of the data storage device 106 may comprise a data bus for exchanging data with the host device 104. For example, the data storage device 106 may exchange data with the host device 104 using the communications network 118. The interface 113 may comprise a control bus for exchanging commands with the host device 104 via the communications network 118. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. In some embodiments, the communications network 118 is a wireless network. The electrical connection of the interface 114 (e.g., the data bus, the control bus, or both) is electrically connected to the controller 108. The electrical connection of the interface 114 provides a connection between the host device 104 and the controller 108, enabling data to be exchanged between the host device 104 and the controller 108. The connection may be an electrical connection in cases where the communications network 118 is a wired network. In some examples, the electrical connection of the interface 114 may also permit the data storage device 106 to receive power from the host device 104. For example, as illustrated in FIG. 1, a power supply 111 may receive power from the host device 104 via the interface 114.

The NVM 110 may comprise a plurality of memory devices. The memory devices may also be referred to as memory units. The NVM 110 is configured to store data. The NVM 110 is configured to enable stored data to be retrieved. For instance, a memory unit of NVM 110 may receive data and a message from the controller 108 that instructs the memory unit to store the data. The NVM 110 may store program instructions configured to be executed by the controller 108. The controller 108 may execute the program instructions to perform the methods described herein. The memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 megabyte (MB), 256 MB, 512 MB, 1 gigabyte (GB), 2 GB, 4 GB, 8 GB, 16 GB, 32 GB, 64 GB, 128 GB, 256 GB, 512 GB, 1 terabyte (TB), etc.).

In some examples, one or more of the memory units of NVM 110 may include any type of non-volatile memory devices. For example, one or more of the memory units of NVM 110 may comprise a flash memory device, phase-change memory (PCM) device, resistive random-access memory (ReRAM) device, magnetoresistive random-access memory (MRAM) device, ferroelectric random-access memory (F-RAM), holographic memory device, and/or any other type of non-volatile memory device.

The NVM 110 may comprise a plurality of memory units. For example, the NVM 110 may comprise a plurality of NVM flash memory devices. The NVM flash memory devices may comprise a plurality of NVM flash memory cells. The NVM flash memory devices may include NAND or NOR based flash memory devices. The NVM flash memory devices may store data based on a charge contained in a floating gate of a transistor for each NVM flash memory cell. A NVM flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 is configured to write data to and read data from NVM flash memory devices at the page level and erase data from NVM flash memory devices at the block level.

The data storage device 106 comprises the power supply 111. The power supply 111 is configured to provide power to one or more components of the data storage device 106. The power supply 111 may operate in a standard mode provide power to one or more components using power provided by an external device, such as the host device 104. For instance, the power supply 111 may provide power to the one or more components using power received from the host device 104 via the interface 114. In some examples, the power supply 111 may include one or more power storage components. The power supply 111 may be configured to operate in a shutdown mode to provide power to the one or more components, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes the volatile memory 112. The controller 108 is configured to use the volatile memory 112 to store information. The volatile memory 112 may include one or more volatile memory devices. In some examples, the controller 108 may use volatile memory 112 as a cache. For instance, the controller 108 may store cached information in the volatile memory 112 until cached information is written to the non-volatile memory 110. As illustrated in FIG. 1, the volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes the controller 108. The controller 108 comprises a processor 109. The processor 109 is configured to execute program instructions stored in memory (e.g. the NVM 110, volatile memory 112 and/or the host DRAM 138) to cause the storage system 100 to function according to the described methods. The processor 109 may comprise one or more microprocessors, central processing units (CPUs), application specific instruction set processors (ASIPs), application specific integrated circuits (ASICs) or other processors capable of reading and executing instruction code.

The controller 108 is configured to manage one or more operations of the data storage device 106. For instance, the controller 108 may manage the reading of data from and/or the writing of data to the NVM 110. In some embodiments, the controller 108 may initiate a data storage command to store data to the NVM 110 and monitor the progress of the data storage command in response to the data storage device 106 receiving a write command from the host device 104. The controller 108 may determine at least one operational characteristic of the storage system 100 and store the at least one operational characteristic to the NVM 110. In some embodiments, the controller 108 temporarily stores data associated with a write command in the internal memory or write buffer 116, in response to the data storage device 106 receiving a write command from the host device 104, before sending the data to the NVM 110. In some other embodiments, the HMB 140 may be utilized.

Host Device 104

Figure 2:
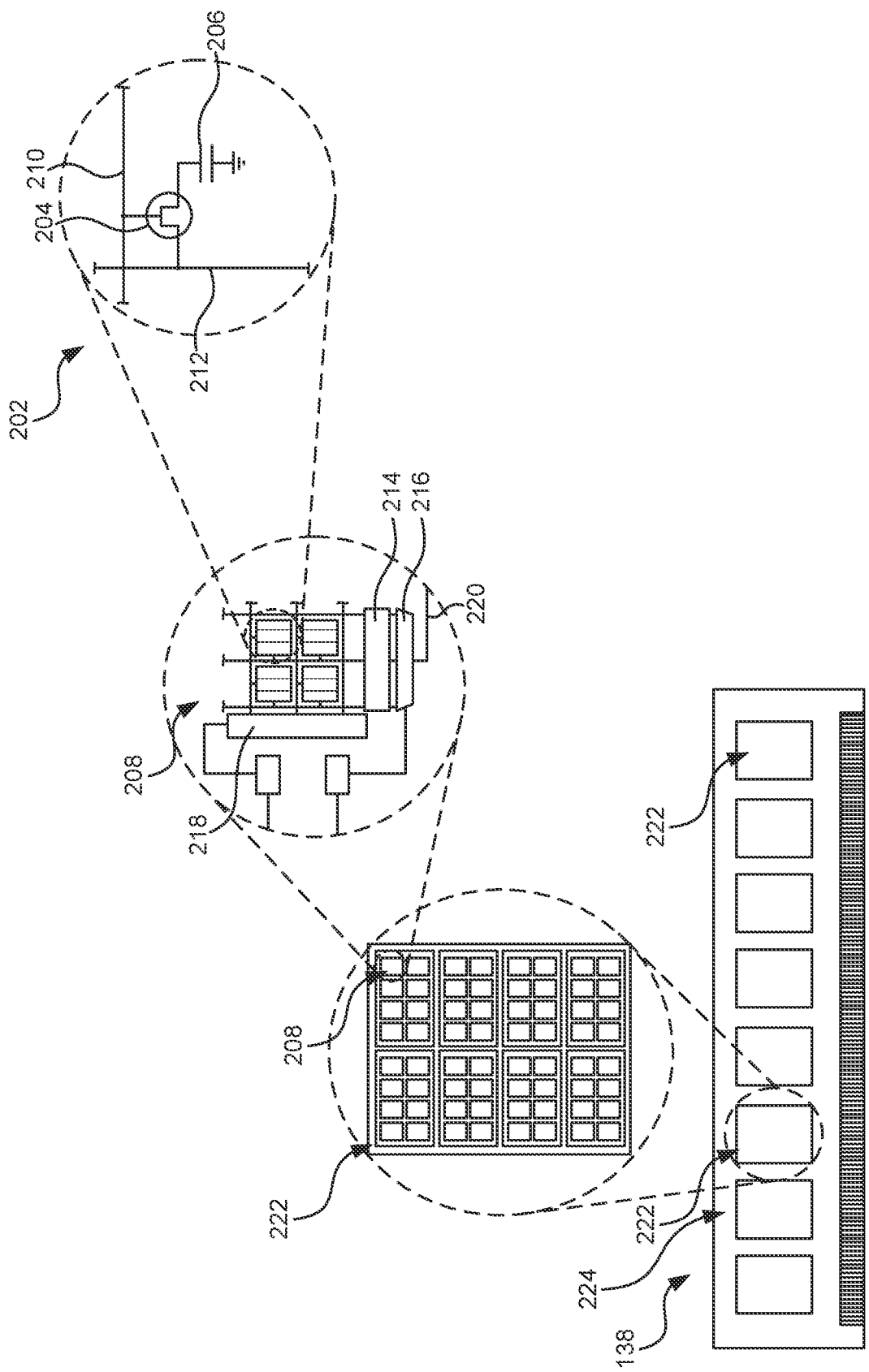
FIG. 2 illustrates a host dynamic random access memory (DRAM) module, according to some embodiments.

Referring to FIG. 2, the host device 104 comprises the host DRAM 138. The host DRAM 138 comprises a number of memory cells 202. A memory cell 202 comprises a transistor 204 and a capacitor 206. The transistor 204 is a metal-oxide-semiconductor field-effect transistor (MOSFET). The transistor 204 comprises a source terminal, a gate terminal and a drain terminal. A first terminal of the capacitor 206 of a memory cell is electrically connected to the drain of the transistor of that memory cell. A second terminal of the capacitor 206 is electrically connected to a ground.

The memory cells 202 are each configured to be switched between a first state and a second state. When in the first state, a memory cell 202 represents a first bit value. For example, the first state may represent a bit value of 0. The first state corresponds to the capacitor 206 of the memory cell 202 being in a discharged state. When in the second state, a memory cell 202 represents a second bit value. For example, the second state may represent a bit value of 1. The second state corresponds to the capacitor 206 of the memory cell 202 being in a charged state.

The host DRAM 138 comprises a plurality of memory cells 202 arranged in a memory cell array 208. The memory cell array 208 may also be referred to as a bank, a block or a memory cell block. The memory cell array 208 comprises a plurality of rows of memory cells and a plurality of columns of memory cells. The gate terminal of a memory cell 202 of the host DRAM 138 is connected to a word line 210. Specifically, the gate terminals of memory cells 202 of a particular row of the memory cell array 208 are connected to a common word line. The source terminal of a memory cell 202 of the host DRAM 138 is connected to a bit line 212. Specifically, the source terminals of memory cells 202 of a particular column of the memory cell array 208 are connected to a common bit line.

The memory cell array 208 comprises a plurality of sense amplifiers 214. Each sense amplifier 214 is electrically connected to a respective bit line 212. The sense amplifiers 214 are configured to latch bit values of memory cells 202 of a particular row of the memory cell array 208. That is, the sense amplifiers 214 are configured to latch bit values of memory cells 202 connected to a common word line 210. The memory cell array 208 comprises a plurality of other components to enable read and write functionality such as a column multiplexer/demultiplexer 216, a row address decoder 218 and a data input/output line 220.

The host DRAM 138 comprises a memory chip 222. The memory chip 222 may also be referred to as a die. The memory chip 222 comprises a plurality of memory cell arrays 208. In some embodiments, the host DRAM 138 comprises a plurality of memory chips 222.

The host DRAM 138 comprises a memory module 224. The memory module 224 may also be referred to as a memory device. The memory module 224 comprises a plurality of memory chips 222. In some embodiments, the host DRAM 138 comprises a plurality of memory modules 224.

One or more of the memory cells 202 of the host DRAM 138 is associated with a memory address. The memory address is a number, for example, a binary number. In some embodiments, each memory cell 202 of the host DRAM 138 is associated with a respective memory address. The host DRAM 138 can therefore be said to comprise a plurality of host DRAM memory addresses. The host DRAM memory addresses span a host DRAM memory address range. The host DRAM memory address range comprises the memory addresses associated with the memory cells 202 of the host DRAM 138. The memory addresses of the host DRAM memory address range are consecutive. The memory addresses of the host DRAM memory address range comprise a first memory address and a last memory address. Intermediate memory addresses of the host DRAM memory address range are between the first memory address and the last memory address.

As the memory addresses of the host DRAM 138 are numbers, for the purposes of this description, it will be understood that a first memory address may be greater than a second memory address. For example, where a first memory address is 11 (i.e. the number 3 when expressed in binary) and a second memory address is 10 (i.e. the number 2 when expressed in binary), it will be understood that the first memory address is greater than the second memory address. In cases such as this, the first memory address may also be referred to as larger than the second memory address, higher than the second memory address and/or more than the second memory address.

Similarly, it will be understood that a first memory address may be less than a second memory address. For example, where the first memory address is 10 (i.e. the number 2 when expressed in binary) and a second memory address is 11 (i.e. the number 3 when expressed in binary), it will be understood that the first memory address is less than the second memory address. In cases such as this, the first memory address may also be referred to as smaller than the second memory address, lower than the second memory address and/or smaller than the second memory address.

A portion of the host DRAM 138 is allocated as the HMB 140. Specifically, a portion of the DRAM memory address range is allocated as the HMB 140. The portion of the DRAM memory address range that is allocated as the HMB 140 may be referred to as a HMB memory address range 500 (illustrated graphically in FIGS. 5 and 10). The memory addresses of the HMB memory address range 500 may be referred to as HMB memory addresses. The HMB memory address range 500 comprises a first HMB memory address. The first HMB memory address is a lowest memory address of the HMB memory address range 500. The HMB memory address range 500 comprises a last HMB memory address. The last HMB memory address is a highest memory address of the HMB memory address range 500. The HMB memory address range 500 comprises a plurality of intermediate HMB memory addresses. The intermediate HMB memory addresses are each higher than the first HMB memory address and lower than the last HMB memory address. The memory addresses of the HMB memory address range 500 are consecutive.

Storing Tree Data Structures

Binary Tree 300

Tree data structures are a type of data structure that can be used to hierarchically store data. Tree data structures such resemble a hierarchical tree. A tree data structure can be defined recursively as a collection of nodes that starts at a root node.

Figure 3:
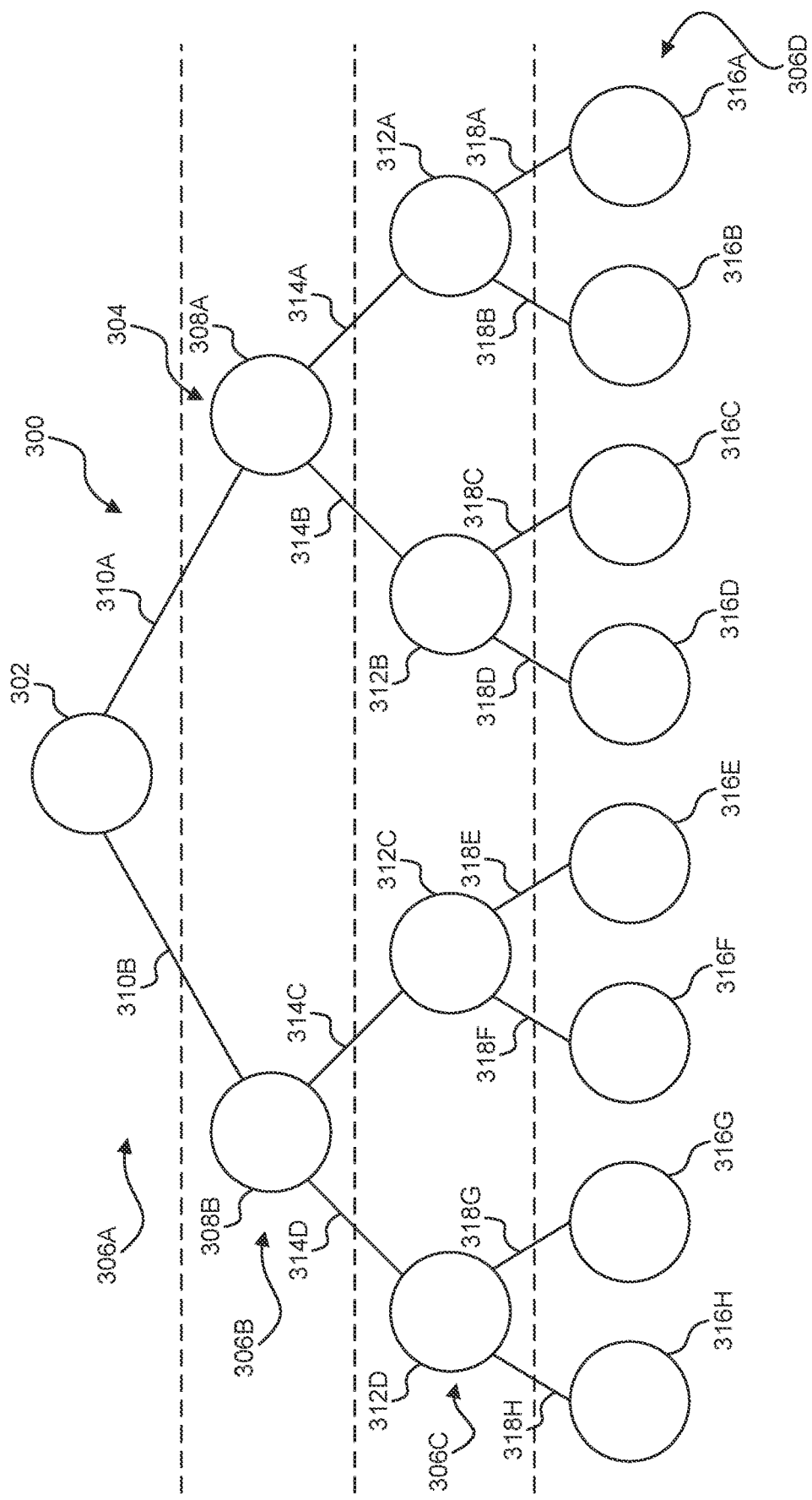
FIG. 3 is a schematic diagram of a binary tree, according to some embodiments.
Figure 4:
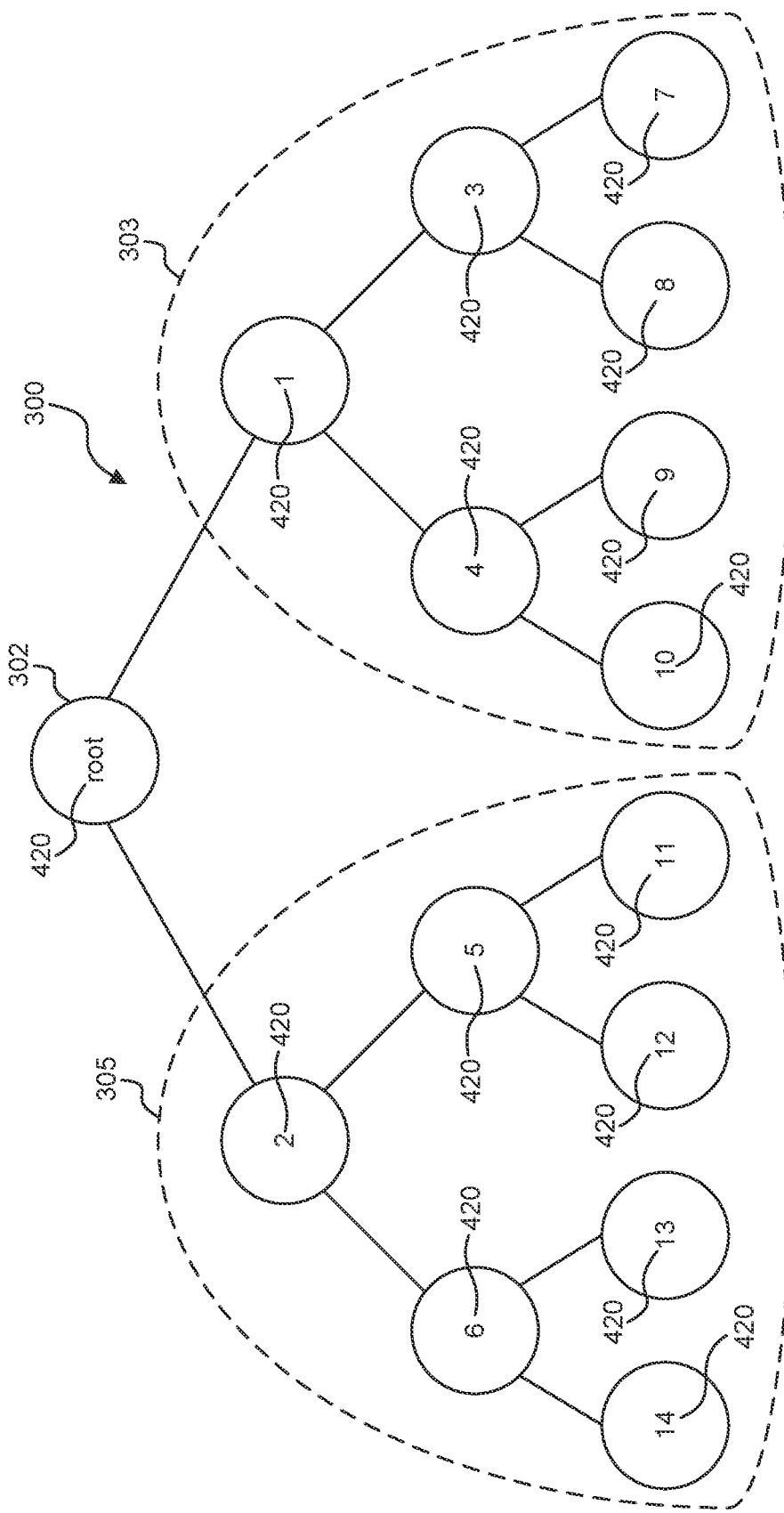
FIG. 4 is another schematic diagram of the binary tree of FIG. 3, according to some embodiments.

FIG. 3 illustrates a schematic diagram of a binary tree 300, according to some embodiments. FIG. 4 illustrates the binary tree 300 of FIG. 3, with each node being labelled with a respective reference label 420 that uniquely identifies the relevant node.

The binary tree 300 comprises a plurality of layers of nodes. Each node is associated with respective node data. Nodes of a particular layer may be associated with nodes of adjacent layers of the binary tree 300. The binary tree 300 comprises a root node 302 and a plurality of additional nodes 304. The root node 302 may be referred to as a binary tree root node.

The binary tree 300 is stored in the HMB 140. The controller 108 is configured to store the binary tree 300 in the HMB 140. In particular, the processor 109 is configured to store the binary tree 300 in the HMB 140. The controller 108 is configured to read the binary tree 300 from the HMB 140. In particular, the processor 109 is configured to read the binary tree 300 from the HMB 140. Reading the binary tree 300 may comprise retrieving node data of one or more nodes of the binary tree 300. The controller 108 is configured to modify the binary tree 300 while the binary tree 300 is stored in the HMB 140. Similarly, the controller 108 is configured to delete one or more nodes of the binary tree 300 from the HMB 140. In particular, the processor 109 is configured to modify the binary tree 300 while the binary tree 300 stored in the HMB 140 (e.g. to add or delete one or more nodes of the binary tree 300).

The binary tree 300 comprises a plurality of layers 306A-D. The root node 302 forms a highest layer 306A of the binary tree 300. In some embodiments, such as that of this description, the highest layer 306A of the binary tree 300 is a zeroth layer 306A of the binary tree 300.

The binary tree 300 comprises a first layer 306B. The first layer 306B comprises a plurality of nodes 308A, 308B. The plurality of nodes 308A, 308B of the first layer 306B are associated with the root node 302. The plurality of nodes 308A, 308B of the first layer 306B may be referred to as first layer nodes 308A, 308B. Each of the first layer nodes 308A, 308B is associated with the root node 302. This association is illustrated in FIG. 3 by first layer links 310A, 310B. The first layer links 310A, 310B may also be referred to as first layer connections.

For the purposes of this disclosure, a first node of a tree data structure (such as the binary tree 300) being associated with a second node of the tree data structure is understood to mean that there is a direct link between the first node and the second node in the tree data structure. That is, the link between the first node and the second node does not traverse any intermediate nodes of the tree data structure. In such a case, the first node can be said to be connected to the second node. The connection is a direct connection.

The first plurality of nodes 308A, 308B comprises a first node 308A and a second node 308B. It will be appreciated that while the first layer 306B is described as having two nodes, in some embodiments, the first layer 306B may have less than two nodes.

The binary tree 300 comprises a second layer 306C. The second layer 306C comprises a second plurality of nodes 312A-D. The second plurality of nodes 312A-D are associated with the first layer nodes 308A, 308B. The second plurality of nodes 312A-D may be referred to as second layer nodes 312A-D. Each of the second layer nodes 312A-D is associated with one of the first layer nodes 308A, 308B. This association is illustrated in FIG. 3 by second layer links 314A-D. The second layer links 314A-D may also be referred to as second layer connections.

The second plurality of nodes 312A-D comprises a first node 312A, a second node 312B, a third node 312C and a fourth node 312D. It will be appreciated that while the second layer 306C is described as having four nodes, in some embodiments, the second layer 306C may have less than four nodes.

The binary tree 300 comprises a third layer 306D. The third layer 306D comprises a third plurality of nodes 316A-H. The third plurality of nodes 316A-H are associated with the second layer nodes 312A-D. The third plurality of nodes 316A-H may be referred to as third layer nodes 316A-H. Each of the third layer nodes 316A-H is associated with one of the second layer nodes 312A-D. This association is illustrated in FIG. 3 by third layer links 318A-H. The third layer links 318A-H may also be referred to as third layer connections.

The third plurality of nodes 316A-H comprises a first node 316A, a second node 316B, a third node 316C, a fourth node 316D, a fifth node 316E, a sixth third node 316F, a seventh node 316G and an eighth node 316H. It will be appreciated that while the third layer 306D is described as having eight nodes, in some embodiments, the third layer 306D may have less than eight nodes.

Although the binary tree 300 is illustrated and described with reference to four layers (the zeroth layer 306A to the third layer 306D), it will be understood that alternative binary trees may have more or less layers.

The zeroth layer 306A is a higher layer of the binary tree 300 than the first layer 306B. In other words, the first layer 306B is a lower layer of the binary tree 300 than the zeroth layer 306A. The zeroth layer 306A is one layer higher in the binary tree 300 than the first layer 306B.

The first layer 306B is a higher layer of the binary tree 300 than the second layer 306C. In other words, the second layer 306C is a lower layer of the binary tree 300 than the first layer 306B. The first layer 306B is one layer higher in the binary tree 300 than the second layer 306C. Generalized, an nth layer may be considered a higher layer of the binary tree 300 than an (n+1)th layer of the binary tree 300. The nth layer is one layer higher in the binary tree 300 than the (n+1)th layer. In other words, the (n+1)th layer of the binary tree 300 is one layer lower in the binary tree 300 than the nth layer.

A node of a particular layer of the binary tree 300 may be associated with one or more nodes of a lower layer of the binary tree 300. For example, the first node 308A of the first layer 306B of the binary tree 300 is associated with the first node 312A of the second layer 306C. The first node 308A of the first layer 306B is also associated with the second node 312B of the second layer 306C of the binary tree 300.

A node of a particular layer of the binary tree 300 that is associated with one or more nodes of a layer of the binary tree 300 that is one layer lower than the particular layer of the relevant node is considered a parent node (or parent) of the associated nodes of the lower layer of the binary tree 300. For example, the first node 308A of the first layer 306B of the binary tree 300 is a parent node of each of the first node 312A of the second layer 306C and the second node 312B of the second layer 306C.

A node of a particular layer of the binary tree 300 that is associated with another node of a layer of the binary tree 300 that is one layer higher than the particular layer of the relevant node is considered a child node (or child) of the associated node of the higher layer of the binary tree 300. For example, the first node 312A and the second node 312B of the second layer 306C of the binary tree 300 are considered child nodes of the first node 308A of the first layer 306B. Nodes that share the same parent node can be referred to as sibling nodes or siblings. For example, the first node 308A of the first layer 306B is a sibling of the second node 308B of the first layer 306B.

Therefore, for the binary tree 300 of FIGS. 3 and 4, the first layer nodes 304A, 304B are child nodes of the root node 302. The second layer nodes 312A-D are child nodes of the first layer nodes 304A, 304B. The third layer nodes 316A-H are child nodes of the second layer nodes 312A-D. In binary trees, each node has at most two child nodes.

Similar familial relationships (grandparents, uncles, nephews etc.) are applicable to nodes of the binary tree 300 that are indirectly associated with each other (e.g. through one or more intermediate nodes). The parent node of the parent node of a particular node is that particular node's grandparent node (or grandparent). Similarly, the child node of a child node of a particular node is a grandchild node (or grandchild) of that particular node. For example, the parent node of the first node 316A of the third layer 306D of the binary tree 300 is the first node 312A of the second layer 306C and the parent node of the first node 312A of the second layer 306C is the first node 308A of the first layer 306B. The first node 308A of the first layer 306B is therefore the grandparent node of the first node 316A of the third layer 306D. Similarly, a child node of the first node 308A of the first layer 306B is the first node 312A of the second layer 306C and a child node of the first node 312A of the second layer 306C is the first node 316A of the third layer 306D. The first node 316A of the third layer 306D is therefore a grandchild node of the first node 308A of the first layer 306B.

A first node of a tree data structure may be directly related to a second node of the tree data structure (i.e. may be a direct relative of the second node) if the first node is connected to the second node by at most one node of each level of the tree data structure that is between the first node and the second node. For example, a reference node is directly related to its grandchild node as the reference node and the grandchild node are connected via the child node of the reference node. A first node of a tree data structure is a descendent node of a second node of the tree data structure if the first node is of a lower layer of the tree data structure than the second node, and it is connected to the second node by at most one node of each level of the tree data structure that is between the first node and the second node. For example, the grandchild node of a reference node is a descendent of the reference node as the grandchild node is of a lower layer of the tree data structure and is connected to the reference node via the child node of the reference node.

The sibling node of the parent node of a particular node is that particular node's uncle node (or uncle). Similarly, a child node of a particular node's sibling node is that particular node's nephew node (or nephew). For example, the parent node of the first node 316A of the third layer 306D is the first node 312A of the second layer 306C and the sibling node of the first node 312A of the second layer 306C is the second node 312B of the second layer 306B. The second node 312B of the second layer 306B is therefore the uncle node of the first node 316A of the third layer 306D. Similarly, the sibling node of the second node 312B of the second layer 306C is the first node 312A of the second layer 306C and a child node of the first node 312A of the second layer 306C is the first node 316A of the third layer 306D. The first node 316A of the third layer 306D is therefore a nephew node of the second node 312B of the second layer 306C. The second node 316B of the third layer 306D is also a nephew node of the second node 312B of the second layer 306C.

A leaf node of a tree data structure is a node that does not have an associated child node. Thus, the third layer nodes 316A-H of the binary tree 300 are leaf nodes of the binary tree 300. A depth of a tree data structure is indicative of a number of layers of the tree data structure. In particular, the depth of a tree data structure corresponds to the number of links between the root node of the tree data structure and a leaf node of the lowest level of the tree data structure. For example, the binary tree 300 has a depth of 3. The depth of a tree data structure is equal to the number of layers n of the tree data structure if the root node is considered the zeroth layer. In cases where the root node is considered the first layer, the depth of the tree data structure is n−1 where n is the number attributed to the lowest layer. It will be understood that while the depth of the binary tree 300 disclosed herein is 3, the disclosure is also applicable to binary trees of greater depths and binary trees of lesser depths (i.e. binary trees with more or fewer layers).

The binary tree 300 comprises binary tree data. Specifically, each node of the binary tree 300 comprises node data. The binary tree data comprises the node data of each of the nodes of the binary tree 300. The node data may comprise, for example, a binary value, an integer, a string, other data or a combination thereof. The node data may also comprise a reference to another node of the binary tree 300. The root node 302 comprises root node data. Each of the first layer nodes 308A, 308B comprises respective first layer node data. Each of the second layer nodes 312A-D comprises respective second layer node data. Each of the third layer nodes 316A-H comprises respective third layer node data. The controller 108 is configured to store the binary tree data in the HMB 140.

The binary tree 300 comprises a first sub-tree 303 and a second sub-tree 305, as shown in FIG. 4. The first sub-tree 303 comprises the first node 308A of the first layer 306B. The first sub-tree 303 also comprises the child nodes and grandchild nodes of the first node 308A of the first layer 306B. It will be understood that in other binary trees that comprise more layers, the first sub-tree may comprise more descendent nodes of the first node of the first layer of the relevant binary tree (e.g. great grandchildren). The second sub-tree 305 comprises the second node 308B of the first layer 306B. The second sub-tree 305 also comprises the child nodes and grandchild nodes of the second node 308B of the first layer 306B. It will be understood that in other binary trees that comprise more layers, the second sub-tree may comprise more descendent nodes of the second node of the first layer of the relevant binary tree (e.g. great grandchildren).

Each node of the binary tree 300 can be associate with a respective layer position. The layer position of a node of the binary tree 300 corresponds to the position of the relevant node in the layer of the binary tree 300 within which the node is found. In some embodiments, the layer position of a node is determined by counting the position of the node in the layer of the binary tree 300 within which the node is found from an edge of the layer. For example, in some embodiments, the layer position of a node is determined by counting the position of the node in the layer of the binary tree 300 within which the node is found from right to left (i.e. when counted from the first node of the particular layer). The layer position is enumerated from 0. That is, the right-most node (or first node) of the relevant layer is associated with a zeroth layer position, with the layer position of the nodes of that layer, progressing from right to left (or away from the first node), increasing by one with each subsequent node.

For example, the layer position of the first node 312A of the second layer 306C is 0. The layer position of the second node 312B of the second layer 306C is 1. The layer position of the third node 312C of the second layer 306C is 2. The layer position of the fourth node 312D of the second layer 306C is 3.

A position of a node of the binary tree 300 may be represented by a node position vector. The node position vector comprises one or more node position vector elements. The node position vector elements of the node position vector of a particular node of the binary tree 300 comprise the respective layer positions of the nodes of the binary tree 300 that are directly related to the particular node, through which the particular node is connected to the root node 302.

For example, nodes of the binary tree 300 that are directly related to the third node 316C of the third layer 306D comprise the parent and grandparent of the third node 316C of the third layer 306D. That is, the nodes of the binary tree 300 that are directly related to the third node 316C of the third layer 306D are the second node 312B of the second layer 306C and the first node 308A of the first layer 306B.

A node position vector of a particular node of a binary tree may be represented as:

$$[i_1, i_2, \ldots, i_{k-1}, i_k]$$

where:

$i_1$ is the layer position of a direct relative of the particular node that is in the first layer of the binary tree;

$i_2$ is the layer position of a direct relative of the particular node that is in the second layer of the binary tree;

$i_{k-1}$ is the layer position of the parent node of the particular node; and $i_k$ is the layer position of the particular node in the layer within which it is found.

For example, the node position vector of the fifth node 316E of the third layer 306D of the binary tree 300 is:

$$[i_1, i_2, i_3] = [1, 2, 4]$$

In this case, $i_1$ is the layer position of the second node 308B of the first layer 306B as this is the node of the first layer 306B that is a direct relative (i.e. the grandparent) of the fifth node 316E of the third layer 306D. $i_2$ is the layer position of the third node 312C of the second layer 306C as this is the node of the second layer 306C that is a direct relative (i.e. the parent) of the fifth node 316E of the third layer 306D. $i_3$ is the layer position of the fifth node 316E of the third layer 306D.

Computer-Implemented Method 600 for Storing Binary Tree Data in Memory

Figure 6:
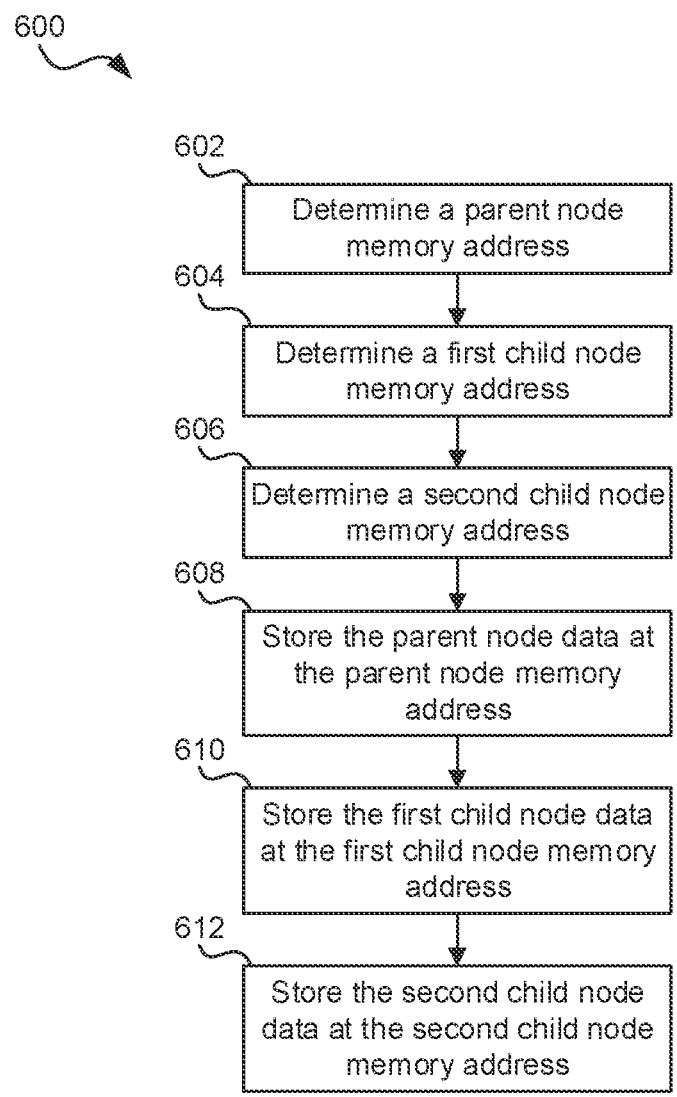
FIG. 6 is a process flow diagram of a computer-implemented method for storing binary tree data in memory, according to some embodiments.

FIG. 6 is a process flow diagram of a computer-implemented method 600 for storing binary tree data in memory, according to some embodiments. The computer-implemented method 600 is performed by the storage system 100. In particular, the computer-implemented method 600 is performed by the controller 108. The controller 108 performs the computer-implemented method 600 to store binary tree data associated with the binary tree 300 in the HMB 140.

As described herein, the HMB 140 comprises a HMB memory address range 500. The HMB memory address range 500 comprises a plurality of memory addresses of the host DRAM 138 that are allocated to the HMB 140. The controller 108 is configured to store node data of the nodes of the binary tree 300 at particular memory addresses within the HMB memory address range 500. By doing so, the nodes of the binary tree 300 are stored in a way that optimizes how they can be subsequently fetched, read and/or written. For the purposes of this description, it will be understood that storing a node of the binary tree 300 at a memory address or at a range of memory addresses corresponds to storing the node data of the relevant node at the memory address or the range of memory addresses.

Also as described herein, the binary tree 300 comprises a root node 302 and a plurality of other nodes 304. A node that is associated with one or more nodes of a layer of the binary tree 300 that is one layer lower than the layer of the relevant node is considered a parent node of the associated nodes of the lower layer of the binary tree 300. By performing the computer-implemented method 600, the controller 108 stores the binary tree 300 in a manner that optimizes later operations such as fetching, reading and/or writing node data. Specifically, the controller 108 stores each parent node of the binary tree 300 between its two child nodes, in the HMB 140. Furthermore, the controller 108 stores each parent node between its two sub-trees.

At 602, the controller 108 determines a memory address of a first node of the binary tree 300 that is to be stored in the HMB 140. The memory address of the first node of the binary tree 300 may be referred to as a first node memory address. The first node of the binary tree 300 that is to be stored in the HMB 140 is a parent node of two other nodes of the binary tree 300. The memory address of the first node of the binary tree 300 may therefore be referred to as a parent node memory address. The parent node comprises parent node data.

The controller 108 determines the memory address at which a particular node of the binary tree 300 is to be stored in the HMB 140 using a predetermined relationship between the position (i.e. the node position vector) of the particular node and the memory address to which it is mapped. For example, the controller 108 determines the memory address at which the first node of the binary tree 300 that is to be stored in the HMB 140 is to be stored using the predetermined relationship. The predetermined relationship may be referred to as a binary tree memory assignment function. The node position vector of the relevant node of the binary tree 300 is used as an input of the binary tree memory assignment function. An output of the binary tree memory assignment function is the memory address at which the particular node of the binary tree 300 is to be stored in the HMB 140. Therefore, to determine the memory address of the HMB 140 at which the first node is to be stored, the controller 108 uses the node position vector of the first node as the input of the binary tree memory assignment function.

The binary tree memory assignment function may be generalized for a binary tree of any depth, and is defined as:

$$bt([i_1, i_2, \ldots, i_{k-1}, i_k]) = -1 - \sum_{j=0}^{k}(-1)^{i_j} 2^{d-j}$$

where:

$[i_1, i_2, \ldots, i_{k-1}, i_k]$ is the node position vector of the particular node under consideration;

$bt([i_1, i_2, \ldots, i_{k-1}, i_k])$ is a memory address indicator (the output of the binary tree memory assignment function) that is indicative of the memory address at which the particular node is to be stored;

$i_1$ is the layer position of the node of the first level of the binary tree that is directly related to the particular node under consideration (which may be referred to as a linked higher level node in the first level of the binary tree);

$i_2$ is the layer position of the node of the second level of the binary tree that is directly related to the particular node under consideration (which may be referred to as a linked higher level node in the second level of the binary tree);

$i_{k-1}$ is the layer position of the parent node of the particular node in a $(k-1)^{th}$ level of the binary tree;

$i_k$ is the layer position of the particular node in a $k^{th}$ level of the binary tree;

$i_0 = 1$; and d is a depth indicator that is indicative of a depth of the binary tree.

Therefore, at 602, the controller 108 determines a memory address of a first node of the binary tree 300 (the parent node) that is to be stored in the HMB 140 using the binary tree memory assignment function.

As previously described, the HMB 140 comprises a HMB memory address range 500. The parent node memory address is within the HMB memory address range 500. That said, a particular memory address within the HMB memory address range 500 may store one bit of data and the parent node data may comprise more than one bit of data. In cases such as this, the controller 108 determines a range of parent node memory addresses. The range of parent node memory addresses comprises the parent node memory address. The parent node memory address may be an initial memory address of the range of parent node memory addresses.

The range of parent node memory addresses comprises a predetermined number of memory addresses. As the number of bits of the parent node data is a known number of bits, the range of parent node memory addresses can be predetermined at this known number of bits.

At 604, the controller 108 determines a memory address of a second node of the binary tree 300 that is to be stored in the HMB 140. The second node of the binary tree 300 that is to be stored in the HMB 140 is a child node of the first node of the binary tree 300 (i.e. a child node of the parent node). The second node of the binary tree 300 that is to be stored in the HMB 140 may therefore be referred to as a first child node. The memory address of the second node of the binary tree 300 may therefore be referred to as a first child node memory address. The first child node comprises first child node data.

The controller 108 determines the first child node memory address using the binary tree memory assignment function. In particular, the controller 108 uses the node position vector of the first child node as an input of the binary tree memory assignment function. An output of the binary tree memory assignment function is the memory address at which the second node of the binary tree 300 (i.e. the first child node) is to be stored in the HMB 140, the first child node memory address.

The first child node memory address is less than the parent node memory address. That is, the output of the binary tree memory assignment function when using the node position vector of the second node of the binary tree 300 that is to be stored in the HMB 140 as an input of the binary tree memory assignment function is less than the output of the binary tree memory assignment function when using the node position vector of the first node of the binary tree 300 that is to be stored in the HMB 140 as an input of the binary tree memory assignment function.

As previously described, the HMB 140 comprises the HMB memory address range 500. The first child node memory address is within the HMB memory address range 500. That said, a particular memory address within the HMB memory address range 500 may store one bit of data and the first child node data may comprise more than one bit of data. In cases such as this, the controller 108 determines a range of first child node memory addresses. The range of first child node memory addresses comprises the first child node memory address. The first child node memory address may be an initial memory address of the range of first child node memory addresses. The controller 108 therefore stores a part of the first child node data at the first child node memory address. The controller 108 stores a remainder of the first child node data at the other memory addresses within the range of first child node memory addresses.

The memory addresses of the range of first child node memory addresses are less than the parent node memory address. The memory addresses of the range of first child node memory addresses are less than the memory addresses of the range of parent node memory addresses. In other words, the memory addresses of the range of parent node memory addresses are greater than the first child node memory address. Similarly, the memory addresses of the range of parent node memory addresses are greater than the memory addresses of the range of first child node memory addresses.

The range of first child node memory addresses comprises a predetermined number of memory addresses. As the number of bits of the first child node data is a known number of bits, the range of first child node memory addresses can be predetermined at this known number of bits.

At 606, the controller 108 determines a memory address of a third node of the binary tree 300 that is to be stored in the HMB 140. The third node of the binary tree 300 that is to be stored in the HMB 140 is a child node of the first node of the binary tree 300. The third node of the binary tree 300 that is to be stored in the HMB 140 may therefore be referred to as a second child node. The memory address of the third node of the binary tree 300 may therefore be referred to as a second child node memory address. The second child node comprises second child node data.

The controller 108 determines the second child node memory address using the binary tree memory assignment function. In particular, the controller 108 uses the node position vector as an input of the binary tree memory assignment function. An output of the binary tree memory assignment function is the memory address at which the third node of the binary tree 300 (i.e. the first child node) is to be stored in the HMB 140, the second child node memory address.

The second child node memory address is greater than the parent node memory address. That is, the output of the binary tree memory assignment function when using the node position vector of the third node of the binary tree 300 that is to be stored in the HMB 140 as an input of the binary tree memory assignment function is greater than the output of the binary tree memory assignment function when using the node position vector of the first node of the binary tree 300 that is to be stored in the HMB 140 as an input of the binary tree memory assignment function.

As previously described, the HMB 140 comprises the HMB memory address range 500. The second child node memory address is within the HMB memory address range 500. That said, a particular memory address within the HMB memory address range 500 may store one bit of data and the second child node data may comprise more than one bit of data. In cases such as this, the controller 108 determines a range of second child node memory addresses. The range of second child node memory addresses comprises the second child node memory address. The second child node memory address may be an initial memory address of the range of second child node memory addresses. The controller 108 therefore stores a part of the second child node data at the second child node memory address. The controller 108 stores a remainder of the second child node data at the other memory addresses within the range of second child node memory addresses.

The memory addresses of the range of second child node memory addresses are greater than the parent node memory address. The memory addresses of the range of second child node memory addresses are greater than the memory addresses of the range of parent node memory addresses. In other words, the memory addresses of the range of parent node memory addresses are less than the second child node memory address. Similarly, the memory addresses of the range of parent node memory addresses are less than the memory addresses of the range of second child node memory addresses.

The range of second child node memory addresses comprises a predetermined number of memory addresses. As the number of bits of the second child node data is a known number of bits, the range of second child node memory addresses can be predetermined at this known number of bits.

In some embodiments, the number of bits of the parent node data is equal to the number of bits of the first child node data. Thus, the predetermined number of memory addresses of the range of parent node memory addresses is equal to the predetermined number of memory addresses of the range of first child node memory addresses.

In some embodiments, the number of bits of the parent node data is equal to the number of bits of the second child node data. Thus, the predetermined number of memory addresses of the range of parent node memory addresses is equal to the predetermined number of memory addresses of the range of second child node memory addresses.

In some embodiments, the node data of each node of the binary tree 300 comprises the same number of bits. Thus, the range of memory addresses associated with each node of the binary tree 300 may comprise the same number of memory addresses.

As the first child node memory address is less than the parent node memory address and the second child node memory address is greater than the parent node memory address, the parent node memory address may be said to be between the first child node memory address and the second child node memory address. Similarly, as the memory addresses of the range of first child node memory addresses are less than the memory addresses of the range of parent node memory addresses and the memory addresses of the range of second child node memory addresses are greater than the memory addresses of the range of parent node memory addresses, the memory addresses of the range of parent node memory addresses may be said the be between the memory addresses of the range of first child node memory addresses and the memory address of the range of second child node memory addresses.

In some embodiments, the range of first child node memory addresses and the range of parent node memory addresses form a consecutive range of memory addresses. In some embodiments, the range of parent node memory addresses and the range of second child node memory addresses form a consecutive range of memory addresses.

As described herein, the parent node is a node of a particular layer of the binary tree 300, for example, a first layer of the binary tree 300. The first child node is a node of another layer of the binary tree 300 that is one layer lower in the binary tree 300 than the layer that comprises the parent node. The second child node is a node of the layer of the binary tree 300 that is one layer lower in the binary tree 300 than the layer that comprises the parent node.

At 608, the controller 108 stores node data of the first node at the first node memory address. As the first node is a parent node of the second node and the third node, the first node memory address may be referred to as a parent node memory address. Similarly, the node data of the first node may be referred to as parent node data. Thus, the controller 108 stores the parent node data at the parent node memory address.

As previously described, a particular memory address within the HMB memory address range 500 may store one bit of data and the parent node data may comprise more than one bit of data. In cases such as this, the controller 108 stores the parent node data at the determined range of parent node memory addresses. The controller 108 therefore stores a part of the parent node data at the parent node memory address.

The controller 108 stores a remainder of the parent node data at the other memory addresses within the range of parent node memory addresses.

At 610, the controller 108 stores node data of the second node at the second node memory address. As the second node is a child node of the first node, the second node memory address may be referred to as a first child node memory address. Similarly, the node data of the second node may be referred to as first child node data. Thus, the controller 108 stores the first child node data at the first child node memory address. The first child node memory address is within the HMB memory address range 500.

As previously described, a particular memory address within the HMB memory address range 500 may store one bit of data and the first child node data may comprise more than one bit of data. In cases such as this, the controller 108 stores the first child node data at the determined range of first child node memory addresses. The controller 108 therefore stores a part of the first child node data at the first child node memory address. The controller 108 stores a remainder of the first child node data at the other memory addresses within the range of first child node memory addresses.

At 612, the controller 108 stores node data of the third node at the third node memory address. As the third node is a child node of the first node, the third node memory address may be referred to as a second child node memory address. Similarly, the node data of the third node may be referred to as second child node data. Thus, the controller 108 stores the second child node data at the second child node memory address. The second child node memory address is within the HMB memory address range 500.

As previously described, a particular memory address within the HMB memory address range 500 may store one bit of data and the second child node data may comprise more than one bit of data. In cases such as this, the controller 108 stores the second child node data at the determined range of second child node memory addresses. The controller 108 therefore stores a part of the second child node data at the second child node memory address. The controller 108 stores a remainder of the second child node data at the other memory addresses within the range of second child node memory addresses.

Although FIG. 6 illustrates determining the parent node memory address, the first child node memory address and the second child node memory address as a linear process, it will be understood that the controller 108 may determine the parent node memory address, the first child node memory address and the second node memory address in another order. Alternatively, the controller 108 may determine one or more of the parent node memory address, the first child node memory address and the second node memory address contemporaneously (e.g. using multiple cores of the processor 109).

For example, in some embodiments, the controller 108 determines the parent node memory address before the controller 108 determines the first child node memory address and the second child node memory address. In some embodiments, the controller 108 determines the first child node memory address before the controller 108 determines the parent node memory address and the second child node memory address. In some embodiments, the controller 108 determines the second child node memory address before the controller 108 determines the parent node memory address and the first child node memory address.

Although FIG. 6 illustrates storing the parent node data at the parent node memory address, storing the first child node data at the first child node memory address and storing the second child node data at the second child node memory address as a linear process, it will be understood that the controller 108 may store the parent node data, the first child node data and the second child node data in another order. Alternatively, the controller 108 may store one or more of the parent node data, the first child node data and the second child node data simultaneously (e.g. using different memory bus channels).

For example, in some embodiments, the controller 108 stores the parent node data at the parent node memory address (or the range of parent node memory addresses) before the controller 108 stores the first child node data at the first child node data memory address (or the range of first child node memory addresses). In some embodiments, the controller 108 stores the parent node data at the parent node memory address (or the range of parent node memory addresses) before the controller 108 stores the second child node data at the second child node data memory address (or the range of second child node memory addresses).

In some embodiments, the controller 108 stores the first child node data at the first child node memory address (or the range of first child node memory addresses) before the controller 108 stores the parent node data at the parent node memory address (or the range of parent node memory addresses). In some embodiments, the controller 108 stores the first child node data at the first child node memory address (or the range of first child node memory addresses) before the controller 108 stores the second child node data at the second child node memory address (or the range of second child node memory addresses).

In some embodiments, the controller 108 stores the second child node data at the second child node memory address (or the range of second child node memory addresses) before the controller 108 stores the parent node data at the parent node memory address (or the range of parent node memory addresses). In some embodiments, the controller 108 stores the second child node data at the second child node memory address (or the range of second child node memory addresses) before the controller 108 stores the first child node data at the first child node memory address (or the range of first child node memory addresses).

The binary tree memory assignment function enables iterative determination of memory addresses at which each of the nodes of the binary tree 300 are to be stored in the HMB 140. In some embodiments, determining the memory address at which a kth node of the binary tree 300 is to be stored in the HMB 140 using the binary tree memory assignment function involves determining the memory address at which the (k−1)th node is to be stored in the HMB 140.

For example, in some embodiments:

$$bt([i_1, i_2, \ldots, i_{k-1}]) = -1 - \sum_{j=0}^{k} (-1)^{i_j} 2^{d-j}$$

may be determined, thereby determining a memory address at which the (k−1)th node is to be stored. Subsequently, $$bt([i_1, i_2, \ldots, i_{k-1}, i_k]) = bt([i_1, i_2, \ldots, i_{k-1}]) - (-1)^{i_k} 2^{d-k}$$

may be determined, thereby determining a memory address at which the kth node is to be stored.

In such embodiments, the memory address at which the (k−1)th node is to be stored is determined prior to the determination of the memory address at which the kth node is to be stored. Furthermore, the determination of the memory address at which the kth node is to be stored is based at least in part on the determination of the memory address at which the (k−1)th node is to be stored. It can therefore be said that in these embodiments, the memory address at which a kth node is to be stored is determined based at least on part on the memory address at which the (k−1)th node is to be stored. Thus, with reference to the computer-implemented method 600, the first child node memory address and/or the second child node memory address may be determined based at least in part on the parent node memory address.

Although the computer-implemented method 600 has been described with reference to a parent node and two associated child nodes of a binary tree such as the binary tree 300, it will be understood that the computer-implemented method 600 may be applicable to any particular set of parent and child nodes of a binary tree of depth d. The controller 108 is configured to iteratively perform the computer-implemented method 600 through each node of the binary tree 300. By doing so, the controller 108 determines a memory address (or a range of memory addresses) within the HMB 140 at which each node of the binary tree 300 is to be stored, such that each parent node is stored between its two child nodes.

Binary Tree Data Stored in Memory

Figure 5:
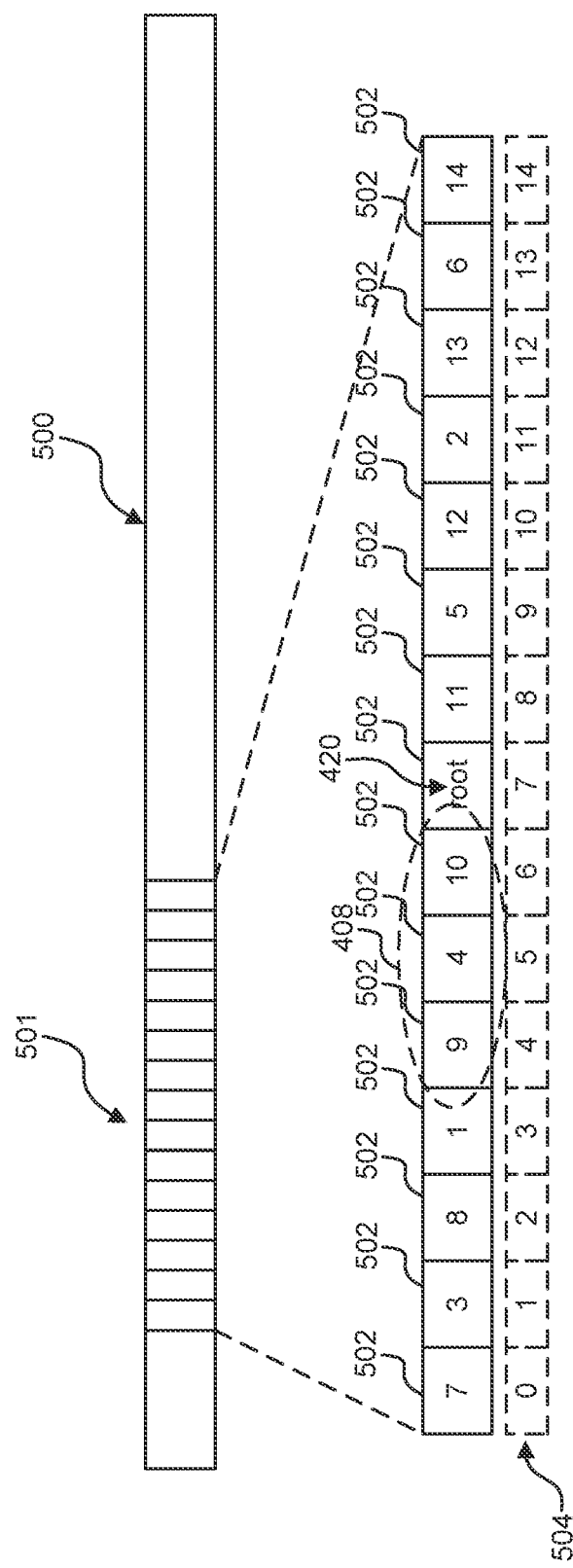
FIG. 5 is a schematic diagram of a host memory buffer (HMB) memory address range, according to some embodiments.

As previously described, the controller 108 performs the computer-implemented method 600, thereby storing the node data of the binary tree 300 in the HMB 140. FIG. 4 illustrates a schematic of the binary tree 300 where each node is labelled with a respective reference label 420 that uniquely identifies the relevant node. FIG. 5 illustrates a schematic diagram of a host memory buffer (HMB) memory address range 500, according to some embodiments. FIG. 5 also shows a binary tree memory address range 501 of the HMB memory address range 500. The binary tree memory address range 501 is allocated for storage of the binary tree data. The binary tree memory address range 501 may be a subset of the total range of memory addresses of the HMB 140.

The binary tree memory address range 501 comprises a plurality of memory address sub-sets 502. Each memory address sub-set 502 represents a range of memory addresses at which node data of a node of the binary tree 300 is stored. The memory address sub-sets 502 are each labelled with the respective reference label 420 of the node of the binary tree 300 whose data is stored at the particular memory address sub-set 502, once the controller 108 has performed the computer-implemented method 600 on each of the nodes of the binary tree 300. As the binary tree 300 comprises 15 nodes (including the root 302), the binary tree memory address range 501 comprises 15 memory address sub-sets 502.

Each memory address sub-set 502 is associated with an index value 504. The index value 504 of a memory address sub-set 502 is indicative of a relative position of the memory address sub-set 502 within the binary tree memory address range 501. For example, the memory addresses of a memory address sub-set 502 that is associated with a higher index value are greater than the memory addresses of a memory address sub-set 502 that is associated with a lower index value. The binary tree memory address range 501 is segmented into a number of memory address sub-sets 502. The number of memory address sub-sets 502 is equal to the number of nodes of the binary tree 300. In some embodiments, each of the memory address sub-sets 502 comprises the same number of memory addresses.

As previously mentioned, the controller 108 determines the memory addresses at which the node data of each node of the binary tree 300 is to be stored using the node position vector of the relevant node as an input of the binary tree memory assignment function. By doing so, the controller 108 stores the node data of each node at a memory address or a memory address range that is between the memory address or range of memory addresses at which its child nodes are stored.

For example, the second node 312B of the second layer 306C is a parent node of the third node 316C of the third layer 306D and the fourth node 316D of the third layer 306D. The second node 312B of the second layer 306C is labelled, in FIG. 4, with a reference label 420 of 5. The fourth node 316D of the third layer 306D is labelled, in FIG. 4, with a reference label 420 of 11. The third node 316C of the third layer 306D is labelled, in FIG. 4, with a reference label 420 of 10. Referring to the HMB memory address range 500 of FIG. 5, it can be seen that the second node 312B of the second layer 306C is stored at a memory address sub-set 502 of the binary tree memory address range 501 that is between the memory address sub-set 502 of the binary tree memory address range 501 at which the fourth node 316D of the third layer 306D is stored and the memory address sub-set 502 of the binary tree memory address range 501 at which the third node 316C of the third layer 306D (as indicated by 408).

Similarly, the root node 302 is a parent node of the first node 308A of the first layer 306B and the second node 308B of the first layer 306B. Referring to the HMB memory address range 500, it can be seen that the root node 302 (which is stored at the memory address sub-set 502 associated the root) is stored between the first node 308A of the first layer 306B (labelled with a 2) and the second node 308B of the first layer 306B (labelled with a 3).

Thus, the controller 108, by performing the computer-implemented method 600 on the binary tree 300, stores the binary tree data of the binary tree 300 in the HMB 140. The controller 108 stores the binary tree data such that a first child node memory address storing at least a part of the first child node data of a first child node of a parent node is less than a parent node memory address storing at least a part of the parent node data of the parent node. The controller 108 stores the binary tree data such that a second child node memory address storing at least a part of the second child node data of a second child node of the parent node is greater than the parent node memory address. This is independent of the position (i.e. node position vector) of the relevant nodes in the binary tree 300. That is, each node of the binary tree 300 that is a parent node of two child nodes is stored between the two child nodes in the HMB 140.

The parent node data is stored at a range of parent node memory addresses that comprises the parent node memory address. The first child node data is stored at a range of first child node memory addresses that comprises the first child node memory address. The second child node data is stored at a range of second child node memory addresses that comprises the second child node memory address.

In some embodiments, memory addresses of the range of first child node memory addresses are less than memory addresses of the range of parent node memory addresses. In some embodiments, memory addresses of the range of second child node memory addresses are greater than memory addresses of the range of parent node memory addresses.

In some embodiments, the range of first child node memory addresses and the range of parent node memory addresses form a consecutive range of memory addresses. In some embodiments, the range of parent node memory addresses and the range of second child node memory addresses form a consecutive range of memory addresses.

As described herein, a parent node is a node that is associated with a node of a lower layer of the binary tree 300. By executing the computer-implemented method 600, the controller stores the binary tree node data such that the parent node data comprises data associated with a first level of a binary tree, the first child node data comprises data associated with a second level of the binary tree, and the second child node data comprises data associated with the second level of the binary tree. The second level of the binary tree is one layer lower in the binary tree than the first layer of the binary tree.

Computer-Implemented Method 600 Examples

A first example of the computer-implemented method 600 is detailed below for illustrative purposes. This example illustrates how the controller 108 can perform the computer-implemented method 600 to determine a memory address of the HMB 140 at which to store the third node 312C of the second layer 306C of the binary tree 300.

The controller 108 determines the node position vector $[i_1, i_2, \ldots, i_{k-1}, i_k]$ of the third node 312C of the second layer 306C of the binary tree 300. The parent node of the third node 312C of the second layer 306C is the second node 308B of the first layer 306B. The layer position of the second node 308B of the first layer 306B is 1. A first element of the node position vector of the third node 312C of the second layer 306C is therefore 1. The layer position of the third node 312C of the second layer 306C is 2. The node position vector of the third node 312C of the second layer 306C of the binary tree 300 is therefore [1, 2].

The controller 108 uses the node position vector of the third node 312C of the second layer 306C as an input of the binary tree memory assignment function. In this case, the depth of the binary tree 300 is 3, so the binary tree memory assignment function is:

$$bt([1, 2]) = -1 - \sum_{j=0}^{2}(-1)^{i_j}2^{3-j}$$

The controller 108 solves the binary tree memory assignment function as detailed below.

$$bt([1,2]) = -1-(((-1)^1 \times 2^{3-0})+((-1)^1 \times 2^{3-1})+((-1)^2 \times 2^{3-2}))$$

$$bt([1,2]) = -1-((-8)+(-4)+(2))$$

$$bt([1,2]) = 9$$

The controller 108 therefore stores the node data of the third node 312C of the second layer 306C of the binary tree 300 at the ninth memory address sub-set 502 of the binary tree memory address range 501 (i.e. the memory address sub-set 502 associated with the index number 9). This is also illustrated in FIG. 5, which shows the node data for the third node 312C of the second layer 306C being stored at the memory address sub-set 502 of the binary tree memory address range 501 that is associate with the index number 9.

A second example of the computer-implemented method 600 is detailed below for illustrative purposes. This example illustrates how the controller 108 can perform the computer-implemented method 600 to determine a memory address of the HMB 140 at which to store the fourth node 316C of the third layer 306D of the binary tree 300.

The controller 108 determines the node position vector $[i_1, i_2, \ldots, i_{k-1}, i_k]$ of the fourth node 316C of the third layer 306D of the binary tree 300. The layer position of the fourth node 316C of the third layer 306D is 3. A third element of the node position vector of the fourth node 316C of the third layer 306D is therefore 3. The parent node of the fourth node 316C of the third layer 306D is the second node 312B of the second layer 306D. The layer position of the second node 312B of the second layer 306D is 1. A second element of the node position vector of the fourth node 316C of the third layer 306D is therefore 1. The parent node of the second node 312B of the second layer 306D is the first node 308A of the first layer 306B. The layer position of the first node 308A of the first layer 306B is 0. A first element of the node position vector of the fourth node 316C of the third layer 306D is therefore 0. The node position vector of the fourth node 316C of the third layer 306D of the binary tree 300 is therefore [0, 1, 3].

The controller 108 uses the node position vector of the fourth node 316C of the third layer 306D as an input of the binary tree memory assignment function. In this case, the depth of the binary tree 300 is 3, so the binary tree memory assignment function is:

$$bt([0, 1, 3]) = -1 - \sum_{j=0}^{3} (-1)^{i_j} 2^{3-j}$$

The controller 108 solves the binary tree memory assignment function as detailed below.

$$bt[0,1,3]=-1-(((-1)^1 \times 2^{3-0})+((-1)^0 \times 2^{3-1})+((-1)^1 \times 2^{3-2})+((-1)^3 \times 2^{3-3}))$$

$$bt([0,1,3])=-1-((-8)+(4)+(-2)+(-1))$$

$$bt([0,1,3])=6$$

The controller 108 therefore stores the node data of the fourth node 316C of the third layer 306D of the binary tree 300 at the sixth memory address sub-set 502 of the binary tree memory address range 501 (i.e. the memory address sub-set 502 associated with the index number 6). This is also illustrated in FIG. 5, which shows the node data for the fourth node 316C of the third layer 306D being stored at the memory address sub-set 502 of the binary tree memory address range 501 that is associated with the index number 6.

Advantages of the Computer-Implemented Method 600

The computer-implemented method 600 enables the node data of each parent node of the binary tree 300 to be stored at a memory address or a memory address range of the HMB 140 that is between the memory addresses or memory address ranges of the parent node's child nodes.

Storing the binary tree data in accordance with the computer-implemented method 600 enables larger amounts of the binary tree data to be fetched in one read transaction and/or a smaller number of read transactions. Where a particular child node is required by the controller 108, it is also likely that the parent node of that child node will be required. In cases where the child nodes under consideration are leaf nodes of the binary tree 300, node data of the parent node and the child nodes will be stored at consecutive memory addresses, with the node data of the parent node being stored at memory addresses between those at which the node data of the child nodes is stored. Therefore, in these cases, the controller 108 can fetch the node data of the parent node and the node data of the child nodes in one read transaction without needing to fetch any additional node data. As this can be done in a reduced number of operations, the computer-implemented method 600 decreases the latency involved in reading nodes of a binary tree. Furthermore, the bandwidth requirements of the communications network 118 are reduced as the controller 108 fetches less unnecessary node data than would be the case if the node data were stored less efficiently.

In cases where the child nodes under consideration are not leaf nodes of the binary tree 300, node data of a particular parent node and the associated child nodes will be not necessarily be stored at consecutive memory addresses; however, the node data of the parent node is still stored at memory addresses between those at which the node data of the child nodes is stored. Therefore, in some cases, the controller 108 can fetch the node data of the parent node and the child nodes in one read transaction whilst minimizing the node data of any intermediate nodes that needs to be fetched (i.e. nodes for which the node data is stored at memory addresses between the memory addresses at which the node data of a child node and the parent node is stored).

In some embodiments, the data storage device 106 interacts with the host device 104 using a PCIe bus or another communications network. In most types of communication, such as PCIe-based data transfer, it is more efficient to transfer a single packet of a larger size than a larger number of packets of a smaller size that, in aggregate, sum to the larger size. Storing the binary tree data in the HMB 140 as described therefore improves later fetching and/or reading of the binary tree data. For example, the latency involved with fetching and/or reading some or all of the binary tree data is reduced as larger portions of the binary tree data can be fetched per transaction. Furthermore, as described above, the node data can be fetched more efficiently due to the particular order in which the node data of particular nodes is stored. This reduces the amount of node data that needs to be discarded for being associated with nodes not required by the controller 108 when fetching a particular node.

Storing the binary tree data in the HMB 140 as described improves the data storage device's 106 performance with respect to writing new data to the HMB 140. For example, where the data storage device 106 would like to write new data to be associated with one or more related nodes of the binary tree 300 (e.g. a parent node and its child nodes), this can be done in less (e.g. one) transaction between the data storage device 106 and the HMB 140.

Derivation of the Binary Tree Memory Assignment Function

The derivation of the binary tree memory assignment function is detailed below with reference to FIG. 7. As previously described, the computer-implemented method 600 uses the node position vectors of each of the nodes of the binary tree 300 as inputs to the binary tree memory assignment function. This enables each parent node of the binary tree to be stored in the HMB 140 between the child nodes that are associated with the relevant parent node.

The number of nodes of a binary tree is:

$$2^{d+1}-1$$

where d is the depth of the binary tree, and each of the sub-trees of the root node has $2^d-1$ nodes.

Figure 7:
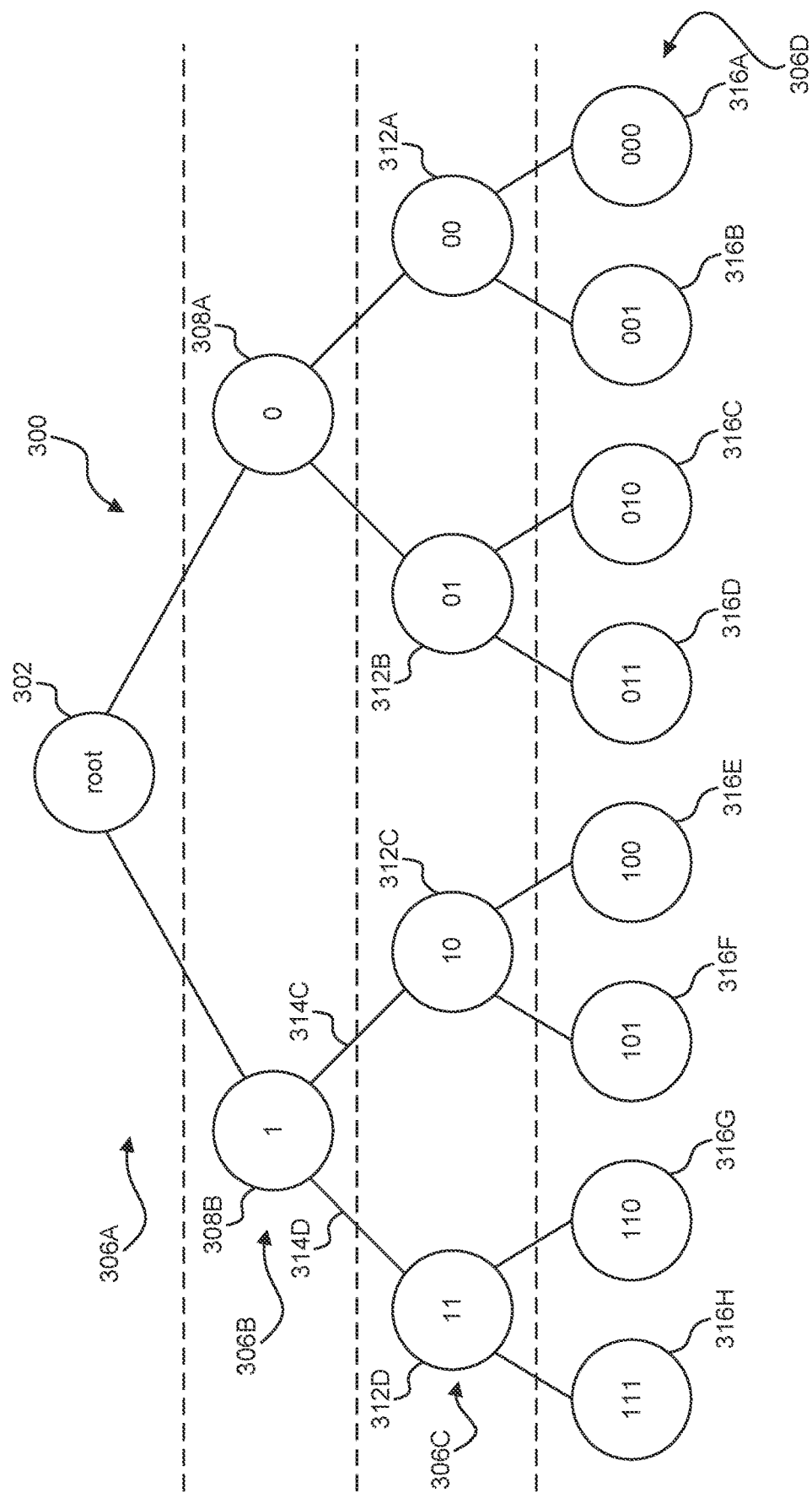
FIG. 7 is another schematic diagram of the binary tree of FIGS. 3 and 4, according to some embodiments.

Labelling the $2^{d+1}-1$ nodes from 0 to $2^{d+1}-2$ as shown in FIG. 7, it becomes apparent that the root node should be stored in memory cell number ($2^d-1$) (i.e. the memory address sub-set 502 associated with an index number of ($2^d-1$)).

Going down one level in the binary tree 300 of FIG. 7, the node labelled '0' to the right of the root, and the node labelled '1' to the left of the root are apparent. Since each of these nodes is to be stored in the middle of its respective $2^d-1$ tree, we see that the nodes labelled '0' and '1' are stored in memory address sub-sets 502 associated with respective index numbers of:

'0' → ($2^d-1$) − $2^{d-1}$

'1' → ($2^d-1$) + $2^{d-1}$

In general, if a node in the $k^{th}$ level is labelled [$i_1$, $i_2$, ..., $i_{k-1}$, $i_k$], let bt([$i_1$, $i_2$, ..., $i_{k-1}$, $i_k$]), (bt for binary tree), denote the memory address (or memory address range) of the node labelled by [$i_1$, $i_2$, ..., $i_{k-1}$, $i_k$]. Then we have the following formula for bt([$i_1$, $i_2$, ..., $i_{k-1}$, $i_k$]):

$$bt([i_1,i_2,\ldots,i_{k-1},i_k]) = bt([i_1,i_2,\ldots,i_{k-1}]) - (-1)^{i_k} 2^{d-k}$$

Explicitly:

$$bt([i_1, i_2, \ldots, i_{k-1}, i_k]) = 2^d - 1 - \sum_{j=1}^{k} (-1)^{i_j} 2^{d-j}$$

Adding a dummy coordinate $i_0=1$, the above equation may be rewritten as the binary tree memory assignment function:

$$bt([i_1, i_2, \ldots, i_{k-1}, i_k]) = -1 - \sum_{j=0}^{k} (-1)^{i_j} 2^{d-j}$$

Applying the binary tree memory assignment function to the binary tree 300 of FIGS. 3 and 4 provides the memory address mapping illustrated in FIG. 5.

Merkle Tree 800

Figure 8:
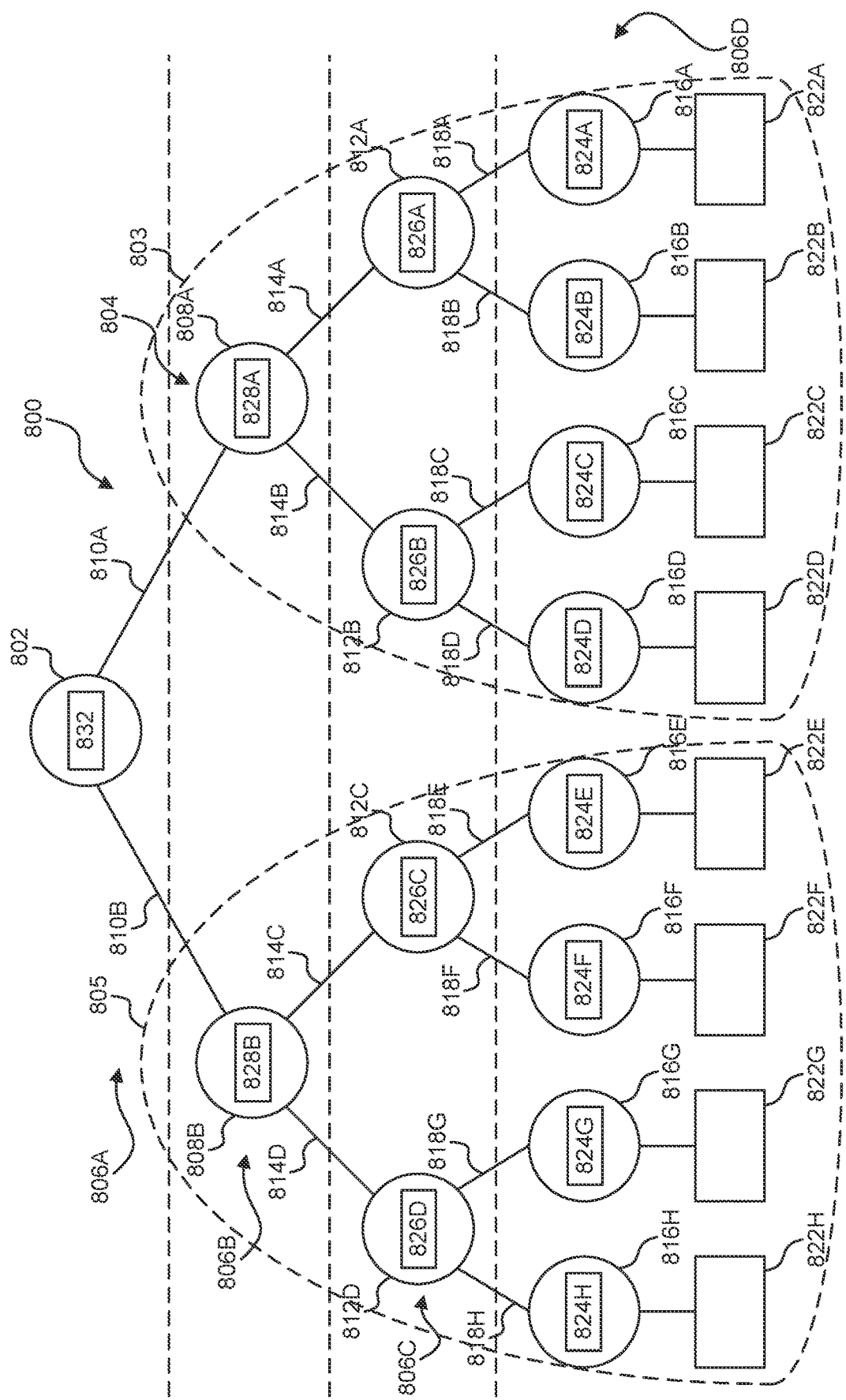
FIG. 8 is a schematic diagram of a Merkle tree, according to some embodiments.

FIG. 8 illustrates a schematic diagram of a Merkle tree 800, according to some embodiments. The Merkle tree 800 is another form of tree data structure that can be used to hierarchically store data.

The Merkle tree 800 comprises a plurality of layers of nodes. Each node is associated with respective node data. Nodes of a particular layer may be associated with nodes of adjacent layers of the Merkle tree 800. The Merkle tree 800 comprises a root node 802 and a plurality of additional nodes 804. The root node 802 of the Merkle tree 800 may be referred to as a Merkle tree root node.

The Merkle tree 800 is stored in the HMB 140. The controller 108 is configured to store the Merkle tree 800 in the HMB 140. In particular, the processor 109 is configured to store the Merkle tree 800 in the HMB 140. The controller 108 is configured to read the Merkle tree 800 from the HMB 140. In particular, the processor 109 is configured to read the Merkle tree 800 from the HMB 140. Reading the Merkle tree 800 may comprise retrieving node data of one or more nodes of the Merkle tree 800. The controller 108 is configured to modify the Merkle tree 800 while the Merkle tree 800 is stored in the HMB 140. Similarly, the controller 108 is configured to delete one or more nodes of the Merkle tree 800 from the HMB 140. In particular, the processor 109 is configured to modify the Merkle tree 800 while the Merkle tree 800 stored in the HMB 140 (e.g. to add or delete one or more nodes of the Merkle tree 800).

The Merkle tree 800 comprises a plurality of layers 806A-D. The root node 802 forms a highest layer 806A of the Merkle tree 800. In some embodiments, such as that of this description, the highest layer 806A of the Merkle tree 800 is a zeroth layer of the Merkle tree 800.

The Merkle tree 800 comprises a first layer 806B. The first layer 806B comprises a plurality of nodes 808A, 808B. The plurality of nodes 808A, 808B of the first layer 806B are associated with the root node 802. The plurality of nodes 808A, 808B of the first layer 806B may be referred to as first layer nodes 808A, 808B. Each of the first layer nodes 808A, 808B is associated with the root node 802. This association is illustrated in FIG. 8 by first layer links 810A, 810B. The first layer links 810A, 810B may also be referred to as first layer connections.

As described herein, for the purposes of this disclosure, a first node of a tree data structure (such as the Merkle tree 800) being associated with a second node of the tree data structure is understood to mean that there is a direct link between the first node and the second node in the tree data structure. That is, the link between the first node and the second node does not traverse any intermediate nodes of the tree data structure. In such a case, the first node can be said to be connected to the second node. The connection is a direct connection.

The first plurality of nodes 808A, 808B comprises a first node 808A and a second node 808B. It will be appreciated that while the first layer 806B is described as having two nodes, in some embodiments, the first layer may have less than two nodes.

The Merkle tree 800 comprises a second layer 806C. The second layer 806C comprises a second plurality of nodes 812A-D. The second plurality of nodes 812A-D are associated with the first layer nodes 808A, 808B. The second plurality of nodes 812A-D may be referred to as second layer nodes 812A-D. Each of the second layer nodes 812A-D is associated with one of the first layer nodes 808A, 808B. This association is illustrated in FIG. 8 by second layer links 814A-D. The second layer links 814A-D may also be referred to as second layer connections.

The second plurality of nodes 812A-D comprises a first node 812A, a second node 812B, a third node 812C and a fourth node 812D. It will be appreciated that while the second layer 806C is described as having four nodes, in some embodiments, the second layer may have less than four nodes.

The Merkle tree 800 comprises a third layer 806D. The third layer 806D comprises a third plurality of nodes 816A-H that are associated with the second layer nodes 812A-D. The third plurality of nodes 816A-H of the third layer 806D may be referred to as third layer nodes 816A-H. Each of the third layer nodes 816A-H is associated with one of the second layer nodes 812A-D. This association is illustrated in FIG. 8 by third layer links 818A-H. The third layer links 818A-H may also be referred to as third layer connections.

The third plurality of nodes 816A-H comprises a first node 816A, a second node 816B, a third node 816C, a fourth node 816D, a fifth node 816E, a sixth third node 816F, a seventh node 816G and an eighth node 816H. It will be appreciated that while the third layer 806D is described as having eight nodes, in some embodiments, the third layer may have less than eight nodes.

Although the Merkle tree 800 is illustrated and described with reference to four layers (the zeroth layer 806A to the third layer 806D), it will be understood that alternative Merkle trees may have more or less layers. For example, the Merkle tree 900 of FIG. 9 comprises an additional fourth layer 906E.

The Merkle Tree 800 comprises Merkle tree data. The Merkle tree 800 comprises a plurality of data blocks 822A-H. The Merkle tree data includes node data and the data blocks 822A-H. The nodes 802, 804 of the Merkle tree 800 comprise the node data. The data blocks 822A-H may comprise entry data that corresponds to data stored in one or more memory devices. The data blocks 822A-H may comprise file data. Specifically, a digital file that is to be securely stored using the Merkle tree 800 may be partitioned into the data blocks 822A-H. The controller 108 is configured to store the Merkle tree data in the HMB 140.

The zeroth layer 806A of the Merkle tree 800 is a higher layer of the Merkle tree 800 than the first layer 806B. In other words, the first layer 806B is a lower layer of the Merkle tree 800 than the zeroth layer 806A. The zeroth layer 806A is one layer higher in the Merkle tree 800 than the first layer 806B.

The first layer 806B is a higher layer of the Merkle tree 800 than the second layer 806C. In other words, the second layer 806C is a lower layer of the Merkle tree 800 than the first layer 806B. The first layer 806B is one layer higher in the Merkle tree 800 than the second layer 806C. Generalized, an nth layer may be considered a higher layer of the Merkle tree 800 than an (n+1)th layer of the Merkle tree 800. The nth layer is one layer higher in the Merkle tree 800 than the (n+1)th layer. In other words, the (n+1)th layer of the Merkle tree 800 is one layer lower in the Merkle tree 800 than the nth layer.

A node of a particular layer of the Merkle tree 800 may be associated with one or more nodes of a lower layer of the Merkle tree 800. For example, a first node 808A of the first layer 806B of the Merkle tree 800 is associated with a first node 812A of the second layer 806C. The first node 808A of the first layer 806B is also associated with a second node 812B of the second layer 806C of the Merkle tree 800.

A node of a particular layer of the Merkle tree 800 that is associated with one or more nodes of a layer of the Merkle tree 800 that is one layer lower than the particular layer of the relevant node is considered a parent node (or parent) of the associated nodes of the lower layer of the Merkle tree 800. For example, the first node 808A of the first layer 806B of the Merkle tree 800 is a parent node of each of the first node 812A of the second layer 806C and the second node 812B of the second layer 806C.

A node of a particular layer of the Merkle tree 800 that is associated with another node of a layer of the Merkle tree 800 that is one layer higher than the particular layer of the relevant node is considered a child node (or child) of the associated node of the higher layer of the Merkle tree 800. For example, the first node 812A and the second node 812B of the second layer 806C of the Merkle tree 800 are considered child nodes of the first node 808A of the first layer 806B. Nodes that share the same parent node can be referred to as sibling nodes or siblings. For example, the first node 808A of the first layer 806B is a sibling of the second node 808A of the first layer 806B.

Therefore, for the Merkle tree 800 of FIG. 8, the first layer nodes 804A, 804B are child nodes of the root node 802. The second layer nodes 812A-D are child nodes of the first layer nodes 804A, 804B. The third layer nodes 816A-H are child nodes of the second layer nodes 812A-D. In Merkle trees, each node has at most two child nodes.

Similar familial relationships (grandparents, uncles, nephews etc.) are applicable to nodes of the Merkle tree 800 that are indirectly associated with each other (e.g. through one or more intermediate nodes). The parent node of the parent node of a particular node is that particular node's grandparent node (or grandparent). Similarly, the child node of a child node of a particular node is a grandchild node (or grandchild) of that particular node. For example, the parent node of the first node 816A of the third layer 806D of the Merkle tree 800 is the first node 812A of the second layer 806C and the parent node of the first node 812A of the second layer 806C is the first node 808A of the first layer 806B. The first node 808A of the first layer 806B is therefore the grandparent node of the first node 816A of the third layer 806D. Similarly, a child node of the first node 808A of the first layer 806B is the first node 812A of the second layer 806C and a child node of the first node 812A of the second layer 806C is the first node 816A of the third layer 806D. The first node 816A of the third layer 806D is therefore a grandchild node of the first node 808A of the first layer 806B.

A first node of a tree data structure may be directly related to a second node of the tree data structure (i.e. may be a direct relative of the second node) if the first node is connected to the second node by at most one node of each level of the tree data structure that is between the first node and the second node. For example, a reference node is directly related to its grandchild node as the reference node and the grandchild node are connected via the child node of the reference node. A first node of a tree data structure is a descendent node of a second node of the tree data structure if the first node is of a lower layer of the tree data structure than the second node, and it is connected to the second node by at most one node of each level of the tree data structure that is between the first node and the second node. For example, the grandchild node of a reference node is a descendent of the reference node as the grandchild node is of a lower layer of the tree data structure and is connected to the reference node via the child node of the reference node.

The sibling node of the parent node of a particular node is that particular node's uncle node (or uncle). Similarly, a child node of a particular node's sibling node is a nephew node (or nephew) of that particular node. For example, the parent node of the first node 816A of the third layer 806D is the first node 812A of the second layer 806C and the sibling node of the first node 812A of the second layer 806C is the second node 812B of the second layer 806B. The second node 812B of the second layer 806B is therefore the uncle node of the first node 816A of the third layer 806D. Similarly, the sibling node of the second node 812B of the second layer 806C is the first node 812A of the second layer 806C and a child node of the first node 812A of the second layer 806C is the first node 816A of the third layer 806D. The first node 816A of the third layer 806D is therefore a nephew node of the second node 812B of the second layer 806C. The second node 816B of the third layer 806D is also a nephew node of the second node 812B of the second layer 806C.

A leaf node of a tree data structure is a node that does not have an associated child node. Thus, the third layer nodes 816A-H of the Merkle tree 800 are leaf nodes of the Merkle tree 800. A depth of a tree data structure is indicative of a number of layers of the tree data structure. In particular, the depth of a tree data structure corresponds to the number of links between the root node of the tree data structure and a leaf node of the lowest level of the tree data structure. For example, the Merkle tree 800 has a depth of 3. The depth of a tree data structure is equal to the number of layers n of the tree data structure if the root node is considered the zeroth layer. In cases where the root node is considered the first layer, the depth of the tree data structure is n−1. It will be understood that while the depth of the Merkle tree 800 of FIG. 8 is 3, the disclosure is also applicable to Merkle trees of greater depths and Merkle trees of lesser depths (i.e. Merkle trees with more or fewer layers). For example, the disclosure is also applicable to the Merkle tree 900 of FIG. 9, which has a depth of 4.

The Merkle tree 800 comprises Merkle tree data. Specifically, each node of the Merkle tree 800 comprises node data. The Merkle tree data comprises the node data of each of the nodes of the Merkle tree 800. The node data of a node may comprise, for example, a binary value, an integer, a string, other data or a combination thereof. The node data may also comprise a reference to another node of the Merkle tree 800. The root node 802 comprises root node data. Each of the first layer nodes 808A, 808B comprises respective first layer node data. Each of the second layer nodes 812A-D comprises respective second layer node data. Each of the third layer nodes 816A-H comprises respective third layer node data.

The Merkle tree 800 comprises a first sub-tree 803 and a second sub-tree 805. The first sub-tree 803 comprises the first node 808A of the first layer 806B. The first sub-tree 803 also comprises the child nodes and grandchild nodes of the first node 808A of the first layer 806B. It will be understood that in other Merkle trees that comprise more layers, the first sub-tree may comprise more descendent nodes of the first node of the first layer of the relevant Merkle tree (e.g. great grandchildren). The second sub-tree 805 comprises the second node 808B of the first layer 806B. The second sub-tree 805 also comprises the child nodes and grandchild nodes of the second node 808B of the first layer 806B. It will be understood that in other Merkle trees that comprise more layers, the second sub-tree may comprise more descendent nodes of the second node of the first layer of the relevant Merkle tree (e.g. great grandchildren).

Each node of the Merkle tree 800 can be associate with a respective layer position. The layer position of a node of the Merkle tree 800 corresponds to the position of the relevant node in the layer of the Merkle tree 800 within which the node is found. In some embodiments, the layer position of a node is determined by counting the position of the node in the layer of the Merkle tree 800 within which the node is found from an edge of the layer. For example, in some embodiments, the layer position of a node is determined by counting the position of the node in the layer of the Merkle tree 800 within which the node is found from right to left (i.e. when counted from the first node of the particular layer). The layer position is enumerated from 0. That is, the right-most node of the relevant layer is associated with a zeroth layer position, with the layer position of the nodes of that layer, progressing from right to left, increasing by one with each subsequent node.

For example, the layer position of the first node 812A of the second layer 806C is 0. The layer position of the second node 812B of the second layer 806C is 1. The layer position of the third node 812C of the second layer 806C is 2. The layer position of the fourth node 812D of the second layer 806C is 3.

A position of a node of the Merkle tree 800 may be represented by a node position vector. The node position vector comprises one or more node position vector elements. The node position vector elements of the node position vector of a particular node of the Merkle tree 800 comprise the respective layer positions of the nodes of the Merkle tree 800 that are directly related to the particular node, through which the particular node is connected to the root node 802.

For example, nodes of the Merkle tree 800 that are directly related to the third node 816C of the third layer 806D comprise the parent and grandparent of the third node 816C of the third layer 806D. That is, the nodes of the Merkle tree 800 that are directly related to the third node 816C of the third layer 806D are the second node 812B of the second layer 806C and the first node 808A of the first layer 806B.

A node position vector of a particular node of a Merkle tree may be represented as:

$$[i_1, i_2, \ldots, i_{k-1}, i_k]$$

where:

$i_1$ is the layer position of a direct relative of the particular node that is in the first layer of the Merkle tree;

$i_2$ is the layer position of a direct relative of the particular node that is in the second layer of the Merkle tree;

$i_{k-1}$ is the layer position of the parent node of the particular node; and $i_k$ is the layer position of the particular node in the layer within which it is found.

For example, the node position vector of the fifth node 816E of the third layer 806D of the Merkle tree 800 is:

$$[i_1, i_2, i_3] = [1, 2, 4]$$

In this case, $i_1$ is the layer position of the second node 808B of the first layer 806B as this is the node of the first layer 806B that is a direct relative (i.e. the grandparent) of the fifth node 816E of the third layer 806D. $i_2$ is the layer position of the third node 812C of the second layer 806C as this is the node of the second layer 806C that is a direct relative (i.e. the parent) of the fifth node 816E of the third layer 806D. $i_3$ is the layer position of the fifth node 816E of the third layer 806D.

The Merkle tree 800 is stored on a host device, such as the HMB 140 of the host device 104 of the storage system 100. The Merkle tree 800 comprises a first hash level 824. The first hash level comprises a first plurality of hashes 824A-H. The number of hashes of the first plurality of hashes 824A-H corresponds to the number of data blocks 822A-H. The first plurality of hashes 824A-H of the Merkle tree 800 comprises a first hash 824A, a second hash 824B, a third hash 824C, a fourth hash 824D, a fifth hash 824E, a sixth hash 824F, a seventh hash 824G and an eighth hash 824H. It will be appreciated that while the first plurality of hashes 824A-H is described as comprising eight hashes, in some embodiments, the first plurality of hashes 824A-H may have more or less than eight hashes (e.g. where there is more or less than 8 data blocks).

Each of the first plurality of hashes 824A-H is associated with a respective third layer node 816A-H. In particular, the node data of each of the third layer nodes 816A-H comprises a respective one of the first plurality of hashes 824A-H. For example, the node data of the first node 816A of the third layer 806D comprises the first hash 824A of the first plurality of hashes 824A-H, the node data of the second node 816B of the third layer 806D comprises the second hash 824B of the first plurality of hashes 824A-H etc.

The first plurality of hashes 824A-H are determined using the data blocks 822A-H. To determine one of the first plurality of hashes 824A-H, a data block is used as an input to a hashing algorithm. In some embodiments, the hashing algorithm may be Secure Hash Algorithm (SHA) 0, SHA-1, SHA-2, SHA-3 or a variant thereof. The relevant hash of the first plurality of hashes 824A-H is the output of the hashing algorithm. For example, the first hash 824A of the first plurality of hashes 824A-H is determined by using the first data block 822A as the input of the hashing algorithm. The first hash 824A is the output of the hashing algorithm when the first data block 822A is used as the input to the hashing algorithm. The rest of the first plurality of hashes 824A-H are determined similarly using the rest of the data blocks 822A-H as inputs to the hashing algorithm.

The Merkle tree 800 comprises a second hash level 826. The second hash level 826 comprises a second plurality of hashes 826A-D. The second plurality of hashes 826A-D of the Merkle tree 800 comprises a first hash 826A, a second hash 826B, a third hash 826C and a fourth hash 826D. It will be appreciated that while the second plurality of hashes 826A-D is described as comprising four hashes, in some embodiments, the second plurality of hashes 826A-D may have more or less than four hashes (e.g. where there is more or less than 8 data blocks).

Each of the second plurality of hashes 826A-D is associated with a respective second layer node 812A-D. In particular, the node data of each of the second layer nodes 812A-D comprises a respective one of the second plurality of hashes 826A-D. For example, the node data of the first node 812A of the second layer 806C comprises the first hash 826A of the second plurality of hashes 826A-D, the node data of the second node 812B of the second layer 806C comprises the second hash 826B of the second plurality of hashes 826A-D etc.

The second plurality of hashes 826A-D are determined using the first plurality of hashes 824A-H. As described herein, each of the first plurality of hashes 824A-H is associated with a respective third layer node 816A-H. Also as described herein, each of the second layer nodes 812A-D is associated with a number of the third layer nodes 816A-H. For example, the first node 812A of the second layer 806C is associated with the first node 816A of the third layer 806D and the second node 816B of the third layer 806D. A hash of the second plurality of hashes 826A-D is determined by summing the hashes of the third layer nodes 816A-H that are associated with the relevant second layer node 812A-D. For example, the first hash 826A of the second plurality of hashes 826A-D (which is associated with the first node 812A of the second layer 806C) is determined by summing the first hash 824A of the first plurality of hashes 824A-H and the second hash 824B of the first plurality of hashes 824A-H, to determine a first hash sum. The first has sum is used as an input to a hashing algorithm (which may or may not be the same as the hashing algorithm used to determine the first plurality of hashes 824A-H). The output of the hashing algorithm is the first hash 826A of the second hash level 826 when the first has sum is used as the input to the hashing algorithm.

The Merkle tree 800 comprises a third hash level 828. The third hash level 828 comprises a third plurality of hashes 828A, 828B. The third plurality of hashes 828A, 828B of the Merkle tree 800 comprises a first hash 828A and a second hash 828B. It will be appreciated that while the third plurality of hashes 828A, 828B is described as comprising two hashes, in some embodiments, the third plurality of hashes 828A, 828B may have more or less than two hashes (e.g. where there is more or less than 8 data blocks). In a case where there is only one node forming the third hash level 828 of the Merkle tree 800, the third plurality of hashes 828A, 828B may simply comprise a single hash.

Each of the third plurality of hashes 828A, 828B is associated with a respective first layer node 808A, 808B. In particular, the node data of each of the first layer nodes 808A, 808B comprises a respective one of the third plurality of hashes 828A, 828B. For example, the node data of the first node 808A of the first layer 806B comprises the first hash 828A of the third plurality of hashes 828A, 828B and the node data of the second node 808B of the first layer 806B comprises the second hash 828B of the third plurality of hashes 828A, 828B.

The third plurality of hashes 828A, 828B are determined using the second plurality of hashes 826A-D. As described herein, each of the second plurality of hashes 826A-D is associated with a respective second layer node 812A-D. Also as described herein, each of the first layer nodes 808A, 808B is associated with a number of the second layer nodes 812A-D. For example, the first node 808A of the first layer 806B is associated with the first node 812A of the second layer 806C and the second node 812B of the second layer 806D. A hash of the first plurality of hashes 828A, 828B is determined by summing the hashes of the second layer nodes 812A-D that are associated with the relevant first layer node 808A, 808B. For example, the first hash 828A of the first plurality of hashes 828A, 828B is determined by summing the first hash 828A of the second plurality of hashes 826A-D and the second hash 826B of the second plurality of hashes 826A-D, to determine a second hash sum. The second hash sum is used as an input to a hashing algorithm (which may or may not be the same as the hashing algorithm used to determine the first plurality of hashes 824A-H and/or the second plurality of hashes 826A-D). The output of the hashing algorithm is the first hash 828A of the third hash level 828 when the second hash sum is used as the input to the hashing algorithm.

The Merkle tree 800 comprises a fourth hash level 830. The fourth hash level 830 comprises a first hash 832. The first hash 832 of the fourth hash level 830 is associated with the root node 802 of the Merkle tree 800. In particular, the root node data comprises the first hash 832 of the fourth hash level 830. The first hash 832 of the fourth hash level 830 may be referred to as a root hash or a root node hash.

The first hash 832 of the fourth hash level 830 is determined using the hashes of the level of the Merkle tree 800 that is one lower than the zeroth level 806A. That is, the first hash 832 of the fourth hash level 830 is determined using the third plurality of hashes 828A, 828B. As described herein, the root node 802 is associated with the first layer nodes 808A, 808B. The first hash 832 of the fourth hash level 830 is determined by summing the hashes of the first plurality of hashes 828A, 828B. Specifically, the first hash 832 of the fourth hash level 830 is determined by summing the first hash 828A of the third plurality of hashes 828A, 828B and the second hash 828B of the third plurality of hashes 828A, 828B, to determine a third hash sum. The third hash sum is used as an input to a hashing algorithm (which may or may not be the same as the hashing algorithm used to determine the first plurality of hashes 824A-H, the second plurality of hashes 826A-D and/or the third plurality of hashes 828A, 828B). The output of the hashing algorithm is the first hash 832 of the fourth hash level 830 when the third sum is used as the input to the hashing algorithm.

The fourth hash level 830 of the Merkle tree 800 may be referred to as a top hash level 830 as it is associated with the root 802 of the Merkle tree 800. The first hash 832 of the first hash level 830 may be referred to as a top level hash of the Merkle tree 800. That said, it will be appreciated that the top hash level of another Merkle tree with a different number of layers (i.e. of a different depth) may be a different hash level of the tree (e.g. a fifth hash level, sixth hash level etc.).

As the top level hash of a Merkle tree is determined based on hashes of the data blocks of the Merkle tree and subsequent hashes derived from these that are associated with each node of the Merkle tree, the top hash level can therefore be said to include a signature that is created using all of the hashes of the relevant Merkle tree. The signature may include ECC data for the combined hashes. For example, the signature of the top level hash may include ECC data for the two hashes of the hash level immediately below the top hash level. The top hash level includes a single hash (e.g., the top level hash). As the Merkle tree 800 moves upward from the plurality of data blocks and toward the top level hash, the hashes of each hash level are progressively combined until the signature of the single top level hash is created for the top hash level, as, for example, has been described with reference to the Merkle tree 800 of FIG. 8.

The Merkle tree 800 is used to secure and validate (such as by using a validity check) a portion of a host device. Due to the progressive nature of the hash levels 824, 826, 828, 830, the signature of the top level hash 832 is altered or corrupted if data of even one of the plurality of data blocks 822A-H is altered or corrupted, such as being altered or corrupted during a network attack. The altered or corrupted signature of the top level hash 832 indicates that data of one or more of the data blocks 822A-H has been altered or corrupted. The Merkle tree 800 and the signature of the top level hash 832 are created in response to data being written and stored in the data blocks 822A-H. The signature of the top level hash 832 is stored as a stored signature or a top level hash 832 signature.

The present disclosure contemplates that FIG. 8 is exemplary and can include more or less data blocks than the data blocks 822A-H illustrated in FIG. 8, more or less hash levels than the hash levels 824, 826, 828, 830 illustrated in FIG. 8, and more or less hashes than the hashes 824A-H, 826A-D, 828A, 828B, 832 shown in FIG. 8.

In some examples, when referring to the Merkle tree 800, the term "hash" may be referred to as "node" interchangeably, for exemplary purposes.

Merkle trees enable efficient and secure verification of the contents of large data structures and are a generalization of hash lists and hash chains. Demonstrating that a leaf node (i.e. one of the nodes of the third layer 806D of the Merkle tree 800) is part of the Merkle tree requires computing a number of hashes proportional to the logarithm of the number of leaf nodes of the tree. This contrasts with hash lists, where the number is proportional to the number of leaf nodes itself.

Merkle Tree 800 Read Flow Example

The controller 108 is configured to read the data blocks 822A-H of the Merkle tree 800. If the controller 108 requires the sixth data block 822F, the controller 108 is required to fetch the fifth hash 824E of the first hash level 824, the fourth hash 826D of the second hash level 826 and the first hash 828A of the third hash level 828. The controller 108 calculates a hash of the sixth data block 822F by using the sixth data block 822F as an input to the hashing algorithm referred to herein. The hash of the sixth data block 822F may be referred to as a first test hash.

The controller 108 sums the hash of the sixth data block 822F and the fifth hash 824E of the first hash level 824 to determine a first hash sum. The controller 108 calculates a hash of the first hash sum by using the first hash sum as an input to the hashing algorithm. The hash of the first hash sum may be referred to as a second test hash.

The controller 108 sums the second test hash and the fourth hash 826D of the second hash level 826 to determine a third hash sum. The controller 108 calculates a hash of the third hash sum by using the third hash sum as an input to the hashing algorithm. The hash of the third hash sum may be referred to as a third test hash.

The controller 108 sums the third test hash and the first hash 828A of the third hash level 828 to determine a fourth hash sum. The controller 108 calculates a hash of the fourth hash sum by using the fourth hash sum as an input to the hashing algorithm. The hash of the fourth hash sum may be referred to as a fourth test hash.

The controller 108 compares the fourth test hash to the first hash 832 of the fourth hash level 830. That is, the computing device compares the fourth test hash to the root node hash. Where the fourth test hash is equal to the root node hash, the computing device can authenticate the sixth data block 822F.

As illustrated by the above Merkle tree read flow example, authenticating data blocks of a Merkle tree requires data to be fetched from the relevant storage device. For example, in the case of the storage system 100, authenticating data blocks 822A-H of the Merkle tree 800 while the Merkle tree 800 is stored in the HMB 140 requires the controller 108 to fetch hashes of the Merkle tree 800 via the communications network 118. The necessary hashes may not be stored in an optimized manner to enable this to be done efficiently. For example, the controller 108 may be required to fetch each hash required for authentication of a particular data block in a separate transaction if the hashes are not stored at consecutive memory addresses of the HMB 140. The bandwidth of the communications network 118 may therefore be a bottleneck of this process in some embodiments. Such a process also introduces significant latency to the authentication process, as performing a large number of fetch transactions takes more time than performing a smaller number of fetch transactions.

Computer-Implemented Method 1100 for Storing Merkle Tree Data in Memory

Figure 11:
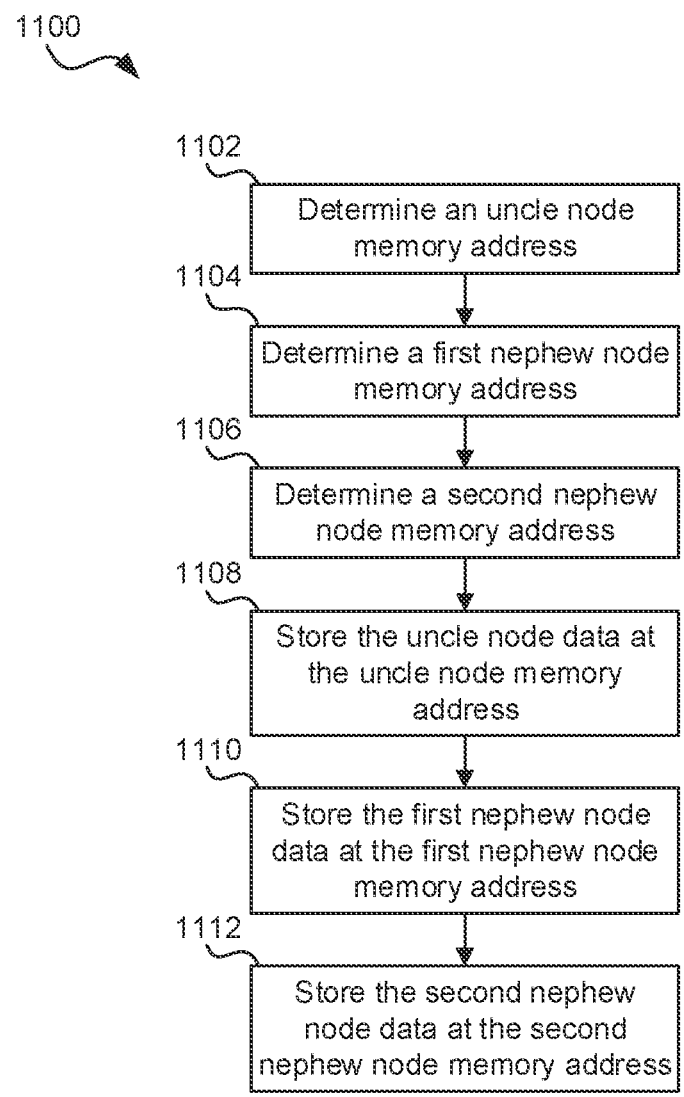
FIG. 11 is a process flow diagram of a computer-implemented method for storing Merkle tree data in memory, according to some embodiments.

FIG. 11 is a process flow diagram of a computer-implemented method 1100 for storing Merkle tree data in memory, according to some embodiments. The computer-implemented method 1100 is performed by the storage system 100. In particular, the computer-implemented method 1100 is performed by the controller 108. The controller 108 performs the computer-implemented method 1100 to store Merkle tree data associated with the Merkle tree 800 (or the Merkle tree 900) in the HMB 140.

As described herein, the HMB 140 comprises a HMB memory address range 500. The HMB memory address range 500 comprises a plurality of memory addresses of the host DRAM 138 that are allocated to the HMB 140. The controller 108 is configured to store node data of the nodes of the Merkle tree 800 at particular memory addresses within the HMB memory address range 500. By doing so, the nodes of the Merkle tree 800 are stored in a way that optimizes how they can be subsequently fetched, read and/or written. For the purposes of this description, it will be understood that storing a node of the Merkle tree 800 at a memory address or at a range of memory addresses corresponds to storing the node data of the relevant node at the memory address or the range of memory addresses. Similarly, it will be understood that storing a node of the Merkle tree 800 at a memory address or at a range of memory addresses corresponds to storing the hash corresponding of the relevant node at the memory address or the range of memory addresses.

Also as described herein, the Merkle tree 800 comprises a root node 802 and a plurality of other nodes 804. The sibling node of the parent node of a particular node is that particular node's uncle node (or uncle). Similarly, a child node of a particular node's sibling node is a nephew node (or nephew) of that particular node. By performing the computer-implemented method 1100, the controller 108 stores the Merkle tree 800 in a manner that optimizes later operations such as fetching, reading and/or writing node data. Specifically, the controller 108 stores each uncle node of the Merkle tree 800 between its nephew nodes, in the HMB 140.

At 1102, the controller 108 determines a memory address of a first node of the Merkle tree 800 that is to be stored in the HMB 140. The memory address of the first node of the Merkle tree 800 may be referred to as a first node memory address. The first node of the Merkle tree 800 that is to be stored in the HMB 140 is an uncle node of two other nodes of the Merkle tree 800. The memory address of the first node of the Merkle tree 800 may therefore be referred to as an uncle node memory address. Therefore, at 1102, the controller 108 determines an uncle node memory address. The uncle node comprises uncle node data.

The controller 108 determines the memory address at which a particular node of the Merkle tree 800 is to be stored in the HMB 140 using a predetermined relationship between the position (i.e. the node position vector) of the particular node and the memory address to which it is mapped. For example, the controller 108 determines the memory address at which the first node of the Merkle tree 800 is to be stored using the predetermined relationship. The predetermined relationship may be referred to as a Merkle tree memory assignment function. The node position vector of the relevant node of the Merkle tree 800 is used as an input of the Merkle tree memory assignment function. An output of the Merkle tree memory assignment function is the memory address at which the particular node of the Merkle tree 800 is to be stored in the HMB 140. In some embodiments, the output of the Merkle tree memory assignment function is an initial memory address at which a first bit of the node data of the relevant node is to be stored. The remaining node data of the relevant node may be stored at memory addresses consecutive to the initial memory address. Therefore, to determine the memory address of the HMB 140 at which the first node is to be stored, the controller 108 uses the node position vector of the first node as the input of the Merkle tree memory assignment function.

The Merkle tree memory assignment function may be generalized for a Merkle tree of any depth, and is defined as:

$$mt([i_1, i_2, \ldots, i_{k-1}, i_k]) = \left[\sum_{j=0}^{k-1} (-1)^{i_j} \times 2^{d-j}\right] - (-1)^{i_k} \times 2^{d-k} + \begin{cases} -i_1 - 1, & k = 1 \\ i_1 - 2, & k > 1 \end{cases}$$

where:

$[i_1, i_2, \ldots, i_{k-1}, i_k]$ is the node position vector of the particular node under consideration;

$mt([i_1, i_2, \ldots, i_{k-1}, i_k])$ is a memory address indicator (the output of the Merkle tree memory assignment function) that is indicative of the memory address at which the particular node is to be stored;

$i_1$ is the layer position of the node of the first level of the Merkle tree that is directly related to the particular node under consideration (which may be referred to as a linked higher level node in the first level of the Merkle tree);

$i_2$ is the layer position of the node of the second level of the Merkle tree that is directly related to the particular node under consideration (which may be referred to as a linked higher level node in the second level of the Merkle tree);

$i_{k-1}$ is the layer position of the parent node of the particular node in a $(k-1)^{th}$ level of the Merkle tree;

$i_k$ is the layer position of the particular node in a $k^{th}$ level of the Merkle tree;

$i_0 = 0$; and d is a depth indicator that is indicative of a depth of the Merkle tree.

Therefore, at 1102, the controller 108 determines a memory address of a first node of the Merkle tree 800 (the uncle node) that is to be stored in the HMB 140 using the Merkle tree memory assignment function.

As previously described, the HMB 140 comprises a HMB memory address range 500. The uncle node memory address is within the HMB memory address range 500. That said, a particular memory address within the HMB memory address range 500 may store one bit of data and the uncle node data may comprise more than one bit of data. In cases such as this, the controller 108 determines a range of uncle node memory addresses. The range of uncle node memory addresses comprises the uncle node memory address. The uncle node memory address may be an initial memory address of the range of uncle node memory addresses.

The range of uncle node memory addresses comprises a predetermined number of memory addresses. As the number of bits of the uncle node data is a known number of bits, the range of uncle node memory addresses can be predetermined at this known number of bits.

At 1104, the controller 108 determines a memory address of a second node of the Merkle tree 800 that is to be stored in the HMB 140. The second node of the Merkle tree 800 is a nephew node of the first node of the Merkle tree 800 (i.e. a nephew node of the uncle node). The second node of the Merkle tree 800 that is to be stored in the HMB 140 may therefore be referred to as a first nephew node. The memory address of the second node of the Merkle tree 800 may therefore be referred to as a first nephew node memory address. Therefore, at 1104, the controller 108 determines a first nephew node memory address. The first nephew node comprises first nephew node data.

The controller 108 determines the first nephew node memory address using the Merkle tree memory assignment function. In particular, the controller 108 uses the node position vector of the first nephew node as an input of the Merkle tree memory assignment function. An output of the Merkle tree memory assignment function is the memory address at which the second node of the Merkle tree 800 (i.e. the first nephew node) is to be stored in the HMB 140, the first nephew node memory address.

For a first set of uncle nodes, the first nephew node memory address is less than the uncle node memory address. That is, the output of the Merkle tree memory assignment function when using the node position vector of the second node of the Merkle tree 800 that is to be stored in the HMB 140 as an input of the Merkle tree memory assignment function is less than the output of the Merkle tree memory assignment function when using the node position vector of the first node of the Merkle tree 800 that is to be stored in the HMB 140 as an input of the Merkle tree memory assignment function.

For a second set of uncle nodes, the first nephew node memory address is greater than the uncle node memory address. That is, the output of the Merkle tree memory assignment function when using the node position vector of the second node of the Merkle tree 800 that is to be stored in the HMB 140 as an input of the Merkle tree memory assignment function is greater than the output of the Merkle tree memory assignment function when using the node position vector of the first node of the Merkle tree 800 that is to be stored in the HMB 140 as an input of the Merkle tree memory assignment function.

As previously described, the HMB 140 comprises the HMB memory address range 500. The first nephew node memory address is within the HMB memory address range 500. That said, a particular memory address within the HMB memory address range 500 may store one bit of data and the first nephew node data may comprise more than one bit of data. In cases such as this, the controller 108 determines a range of first nephew node memory addresses. The range of first nephew node memory addresses comprises the first nephew node memory address. The first nephew node memory address may be an initial memory address of the range of first nephew node memory addresses. The controller 108 therefore stores a part of the first nephew node data at the first nephew node memory address. The controller 108 stores a remainder of the first nephew node data at the other memory addresses within the range of first nephew node memory addresses.

For the first set of uncle nodes, the memory addresses of the range of first nephew node memory addresses are less than the uncle node memory address. The memory addresses of the range of first nephew node memory addresses are less than the memory addresses of the range of uncle node memory addresses. In other words, the memory addresses of the range of uncle node memory addresses are greater than the first nephew node memory address. Similarly, the memory addresses of the range of uncle node memory addresses are greater than the memory addresses of the range of first nephew node memory addresses.

For the second set of uncle nodes, the memory addresses of the range of first nephew node memory addresses are greater than the uncle node memory address. The memory addresses of the range of first nephew node memory addresses are greater than the memory addresses of the range of uncle node memory addresses. In other words, the memory addresses of the range of uncle node memory addresses are less than the first nephew node memory address. Similarly, the memory addresses of the range of uncle node memory addresses are less than the memory addresses of the range of first nephew node memory addresses.

The range of first nephew node memory addresses comprises a predetermined number of memory addresses. As the number of bits of the first nephew node data is a known number of bits, the range of first nephew node memory addresses can be predetermined at this known number of bits.

At 1106, the controller 108 determines a memory address of a third node of the Merkle tree 800 that is to be stored in the HMB 140. The third node of the Merkle tree 800 is a nephew node of the first node of the Merkle tree 800. The third node of the Merkle tree 800 that is to be stored in the HMB 140 may therefore be referred to as a second nephew node. The memory address of the third node of the Merkle tree 800 may therefore be referred to as a second nephew node memory address. Therefore, at 1106, the controller 108 determines a second nephew node memory address. The second nephew node comprises second nephew node data.

The controller 108 determines the second nephew node memory address using the Merkle tree memory assignment function. In particular, the controller 108 uses the node position vector as an input of the Merkle tree memory assignment function. An output of the Merkle tree memory assignment function is the memory address at which the third node of the Merkle tree 800 (i.e. the first nephew node) is to be stored in the HMB 140, the second nephew node memory address.

For the first set of uncle nodes, the second nephew node memory address is greater than the uncle node memory address. That is, the output of the Merkle tree memory assignment function when using the node position vector of the third node of the Merkle tree 800 that is to be stored in the HMB 140 as an input of the Merkle tree memory assignment function is greater than the output of the Merkle tree memory assignment function when using the node position vector of the first node of the Merkle tree 800 that is to be stored in the HMB 140 as an input of the Merkle tree memory assignment function.

For the second set of uncle nodes, the second nephew node memory address is less than the uncle node memory address. That is, the output of the Merkle tree memory assignment function when using the node position vector of the third node of the Merkle tree 800 that is to be stored in the HMB 140 as an input of the Merkle tree memory assignment function is less than the output of the Merkle tree memory assignment function when using the node position vector of the first node of the Merkle tree 800 that is to be stored in the HMB 140 as an input of the Merkle tree memory assignment function.

As previously described, the HMB 140 comprises the HMB memory address range 500. The second nephew node memory address is within the HMB memory address range 500. That said, a particular memory address within the HMB memory address range 500 may store one bit of data and the second nephew node data may comprise more than one bit of data. In cases such as this, the controller 108 determines a range of second nephew node memory addresses. The range of second nephew node memory addresses comprises the second nephew node memory address. The second nephew node memory address may be an initial memory address of the range of second nephew node memory addresses. The controller 108 therefore stores a part of the second nephew node data at the second nephew node memory address. The controller 108 stores a remainder of the second nephew node data at the other memory addresses within the range of second nephew node memory addresses.

For the first set of uncle nodes, the memory addresses of the range of second nephew node memory addresses are greater than the uncle node memory address. The memory addresses of the range of second nephew node memory addresses are greater than the memory addresses of the range of uncle node memory addresses. In other words, the memory addresses of the range of uncle node memory addresses are less than the second nephew node memory address. Similarly, the memory addresses of the range of uncle node memory addresses are less than the memory addresses of the range of second nephew node memory addresses.

For the second set of uncle nodes, the memory addresses of the range of second nephew node memory addresses are less than the uncle node memory address. The memory addresses of the range of second nephew node memory addresses are less than the memory addresses of the range of uncle node memory addresses. In other words, the memory addresses of the range of uncle node memory addresses are greater than the second nephew node memory address. Similarly, the memory addresses of the range of uncle node memory addresses are greater than the memory addresses of the range of second nephew node memory addresses.

The range of second nephew node memory addresses comprises a predetermined number of memory addresses. As the number of bits of the second nephew node data is a known number of bits, the range of second nephew node memory addresses can be predetermined at this known number of bits.

In some embodiments, the number of bits of the uncle node data is equal to the number of bits of the first nephew node data. Thus, the predetermined number of memory addresses of the range of uncle node memory addresses is equal to the predetermined number of memory addresses of the range of first nephew node memory addresses.

In some embodiments, the number of bits of the uncle node data is equal to the number of bits of the second nephew node data. Thus, the predetermined number of memory addresses of the range of uncle node memory addresses is equal to the predetermined number of memory addresses of the range of second nephew node memory addresses.

In some embodiments, the node data of each node of the Merkle tree 800 comprises the same number of bits. Thus, the range of memory addresses associated with each node of the Merkle tree 800 may comprise the same number of memory addresses.

As, for the first set of uncle nodes, the first nephew node memory address is less than the uncle node memory address and the second nephew node memory address is greater than the uncle node memory address, the uncle node memory address may be said to be between the first nephew node memory address and the second nephew node memory address. Similarly, as, for the second set of uncle nodes, the first nephew node memory address is greater than the uncle node memory address and the second nephew node memory address is less than the uncle node memory address, the uncle node memory address may be said to be between the first nephew node memory address and the second nephew node memory address.

As, for the first set of uncle nodes, the memory addresses of the range of first nephew node memory addresses are less than the memory addresses of the range of uncle node memory addresses and the memory addresses of the range of second nephew node memory addresses are greater than the memory addresses of the range of uncle node memory addresses, the memory addresses of the range of uncle node memory addresses may be said the be between the memory addresses of the range of first nephew node memory addresses and the memory addresses of the range of second nephew node memory addresses. Similarly, as, for the second set of uncle nodes, the memory addresses of the range of first nephew node memory addresses are greater than the memory addresses of the range of uncle node memory addresses and the memory addresses of the range of second nephew node memory addresses are less than the memory addresses of the range of uncle node memory addresses, the memory addresses of the range of uncle node memory addresses may be said the be between the memory addresses of the range of first nephew node memory addresses and the memory addresses of the range of second nephew node memory addresses.

In some embodiments, the range of first nephew node memory addresses and the range of uncle node memory addresses form a consecutive range of memory addresses. In some embodiments, the range of uncle node memory addresses and the range of second nephew node memory addresses form a consecutive range of memory addresses.

As described herein, the uncle node is a node of a particular layer of the Merkle tree 800, for example, a first layer of the Merkle tree 800. The first nephew node is a node of another layer of the Merkle tree 800 that is one layer lower in the Merkle tree 800 than the layer that comprises the uncle node. The second nephew node is a node of the layer of the Merkle tree 800 that is one layer lower in the Merkle tree 800 than the layer that comprises the uncle node.

At 1108, the controller 108 stores node data of the first node at the first node memory address. As the first node is an uncle node of the second node and the third node, the first node memory address may be referred to as an uncle node memory address. Similarly, the node data of the first node may be referred to as uncle node data. Thus, the controller 108 stores the uncle node data at the uncle node memory address.

As previously described, a particular memory address within the HMB memory address range 500 may store one bit of data and the uncle node data may comprise more than one bit of data. In cases such as this, the controller 108 stores the uncle node data at the determined range of uncle node memory addresses. The controller 108 therefore stores a part of the uncle node data at the uncle node memory address. The controller 108 stores a remainder of the uncle node data at the other memory addresses within the range of uncle node memory addresses.

At 1110, the controller 108 stores node data of the second node at the second node memory address. As the second node is a nephew node of the first node, the second node memory address may be referred to as a first nephew node memory address. Similarly, the node data of the second node may be referred to as first nephew node data. Thus, the controller 108 stores the first nephew node data at the first nephew node memory address. The first nephew node memory address is within the HMB memory address range 500.

As previously described, a particular memory address within the HMB memory address range 500 may store one bit of data and the first nephew node data may comprise more than one bit of data. In cases such as this, the controller 108 stores the first nephew node data at the determined range of first nephew node memory addresses. The controller 108 therefore stores a part of the first nephew node data at the first nephew node memory address. The controller 108 stores a remainder of the first nephew node data at the other memory addresses within the range of first nephew node memory addresses.

At 1112, the controller 108 stores node data of the third node at the third node memory address. As the third node is a nephew node of the first node, the third node memory address may be referred to as a second nephew node memory address. Similarly, the node data of the third node may be referred to as second nephew node data. Thus, the controller 108 stores the second nephew node data at the second nephew node memory address. The second nephew node memory address is within the HMB memory address range 500.

As previously described, a particular memory address within the HMB memory address range 500 may store one bit of data and the second nephew node data may comprise more than one bit of data. In cases such as this, the controller 108 stores the second nephew node data at the determined range of second nephew node memory addresses. The controller 108 therefore stores a part of the second nephew node data at the second nephew node memory address. The controller 108 stores a remainder of the second nephew node data at the other memory addresses within the range of second nephew node memory addresses.

Although FIG. 11 illustrates determining the uncle node memory address, the first nephew node memory address and the second nephew node memory address as a linear process, it will be understood that the controller 108 may determine the uncle node memory address, the first nephew node memory address and the second nephew node memory address in another order. Alternatively, the controller 108 may determine one or more of the uncle node memory address, the first nephew node memory address and the second nephew node memory address contemporaneously (e.g. using multiple cores of the processor 109).

For example, in some embodiments, the controller 108 determines the uncle node memory address before the controller 108 determines the first nephew node memory address and the second nephew node memory address. In some embodiments, the controller 108 determines the first nephew node memory address before the controller 108 determines the uncle node memory address and the second nephew node memory address. In some embodiments, the controller 108 determines the second nephew node memory address before the controller 108 determines the uncle node memory address and the first nephew node memory address.

Although FIG. 11 illustrates storing the uncle node data at the uncle node memory address, storing the first nephew node data at the first nephew node memory address and storing the second nephew node data at the second nephew node memory address as a linear process, it will be understood that the controller 108 may store the uncle node data, the first nephew node data and the second nephew node data in another order. Alternatively, the controller 108 may store one or more of the uncle node data, the first nephew node data and the second nephew node data simultaneously (e.g. using different memory bus channels).

For example, in some embodiments, the controller 108 stores the uncle node data at the uncle node memory address (or the range of uncle node memory addresses) before the controller 108 stores the first nephew node data at the first nephew node data memory address (or the range of first nephew node memory addresses). In some embodiments, the controller 108 stores the uncle node data at the uncle node memory address (or the range of uncle node memory addresses) before the controller 108 stores the second nephew node data at the second nephew node data memory address (or the range of second nephew node memory addresses).

In some embodiments, the controller 108 stores the first nephew node data at the first nephew node memory address (or the range of first nephew node memory addresses) before the controller 108 stores the uncle node data at the uncle node memory address (or the range of uncle node memory addresses). In some embodiments, the controller 108 stores the first nephew node data at the first nephew node memory address (or the range of first nephew node memory addresses) before the controller 108 stores the second nephew node data at the second nephew node memory address (or the range of second nephew node memory addresses).

In some embodiments, the controller 108 stores the second nephew node data at the second nephew node memory address (or the range of second nephew node memory addresses) before the controller 108 stores the uncle node data at the uncle node memory address (or the range of uncle node memory addresses). In some embodiments, the controller 108 stores the second nephew node data at the second nephew node memory address (or the range of second nephew node memory addresses) before the controller 108 stores the first nephew node data at the first nephew node memory address (or the range of first nephew node memory addresses).

The Merkle tree memory assignment function enables iterative determination of memory addresses at which each of the nodes of the Merkle tree 800 are to be stored in the HMB 140. In some embodiments, determining the memory address at which a nephew node of the Merkle tree 800 is to be stored in the HMB 140 using the Merkle tree memory assignment function involves determining the memory address at which the uncle node of the relevant nephew node is to be stored in the HMB 140.

Although the computer-implemented method 1100 has been described with reference to an uncle node and two associated nephew nodes of a Merkle tree such as the Merkle tree 800, it will be understood that the computer-implemented method 1100 may be applicable to any particular set of uncle and nephew nodes of a Merkle tree of depth d. The controller 108 is configured to iteratively perform the computer-implemented method 1100 through each of the nodes of the Merkle tree 800. By doing so, the controller 108 determines a memory address (or a range of memory addresses) within the HMB 140 at which each node of the Merkle tree 800 is to be stored, such that each uncle node is stored between its two nephew nodes.

Merkle Tree Data Stored in Memory

Figure 9:
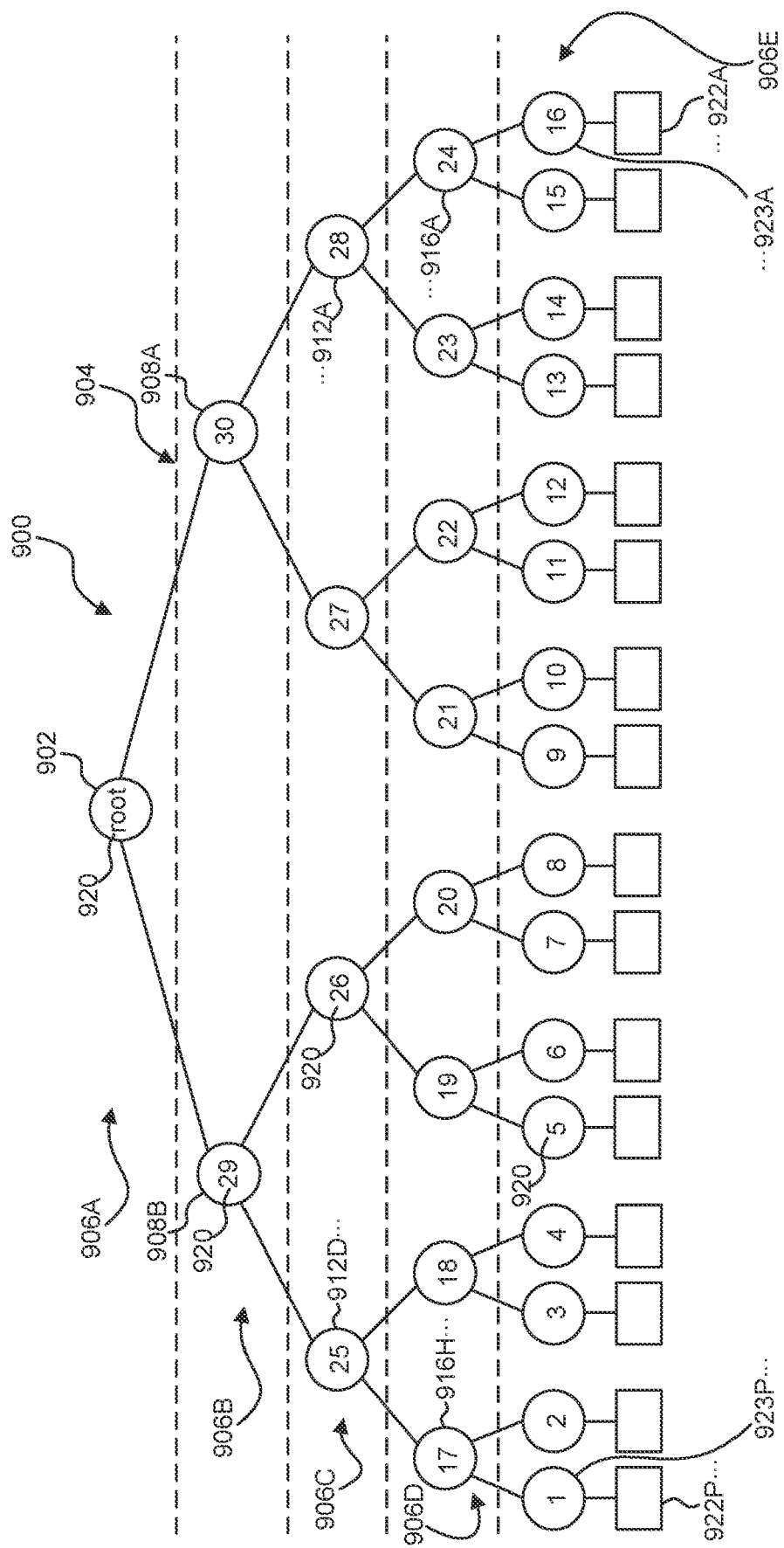
FIG. 9 is a schematic diagram of another Merkle tree, according to some embodiments.

As previously described, the controller 108 performs the computer-implemented method 1100, thereby storing the node data of the Merkle tree 800 in the HMB 140. The controller 108 may perform the computer-implemented method 1100 to store node data of alternate Merkle trees in the same way (i.e. such that each uncle node is stored between its two nephew nodes). FIG. 9 illustrates a schematic of a Merkle tree 900, according to some embodiments. The Merkle tree 900 comprises a plurality of layers of nodes, as previously described with reference to the Merkle tree 800 of FIG. 8. Specifically, the Merkle tree 900 comprises a root node 902 and a plurality of additional nodes 904.

The Merkle tree 900 comprises a plurality of layers 906A-E. The root node 902 forms a highest layer 906A of the Merkle tree 900. In some embodiments, such as that of this description, the highest layer 906A of the Merkle tree 900 is a zeroth layer of the Merkle tree 900, like the highest layer 806A of the Merkle tree 800 of FIG. 8.

The Merkle tree 900 comprises a first layer 906B. The first layer 906B comprises first layer nodes 908A, 908B, which may be as described with reference to the first layer nodes 808A, 808B of the Merkle tree 800 of FIG. 8.

The Merkle tree 900 comprises a second layer 906C. The second layer 906C comprises second layer nodes 912A-D, which may be as described with reference to the second layer nodes 812A-D of the Merkle tree 800 of FIG. 8.

The Merkle tree 900 comprises a third layer 906D. The third layer 906D comprises third layer nodes 916A-H, which may be as described with reference to the third layer nodes 816A-H of the Merkle tree 800 of FIG. 8.

The Merkle tree 900 comprises a fourth layer 906E. The fourth layer 906E comprises fourth layer nodes 923A-P. The fourth layer nodes 923A-P may be nodes as described with reference to the Merkle tree 800 of FIG. 8. That is, each of the fourth layer nodes 923A-P is associated with one of the third layer nodes 916A-H. The fourth layer nodes 923A-P are child nodes of the associated third layer nodes 916A-H.

The Merkle Tree 900 comprises Merkle tree data. The Merkle tree 900 comprises a plurality of data blocks 922A-P. The Merkle tree data includes node data and the data blocks 922A-P. The nodes 902, 904 of the Merkle tree 900 comprise the node data. The data blocks 922A-P may comprise entry data that corresponds to data stored in one or more memory devices. The data blocks 922A-P may comprise file data. Specifically, a digital file that is to be securely stored using the Merkle tree 900 may be partitioned into the data blocks 922A-P.

The node data of each node of the Merkle tree 900 comprises a hash. The hash of each node of the Merkle tree 900 may be determined as described with reference to the hashes of the Merkle tree 800 of FIG. 8. For example, the hashes of the nodes of the fourth level 906E are determined by using a respective one of the data blocks 922A-P as an input of a hash function. The hashes of the nodes of higher levels of the Merkle tree 900 are determined by summing the hashes of the child nodes of the node under consideration and using the sum as an input of the hashing algorithm.

Each node of the Merkle tree 900 is labelled with a respective reference label 920 that uniquely identifies the relevant node.

Figure 10:
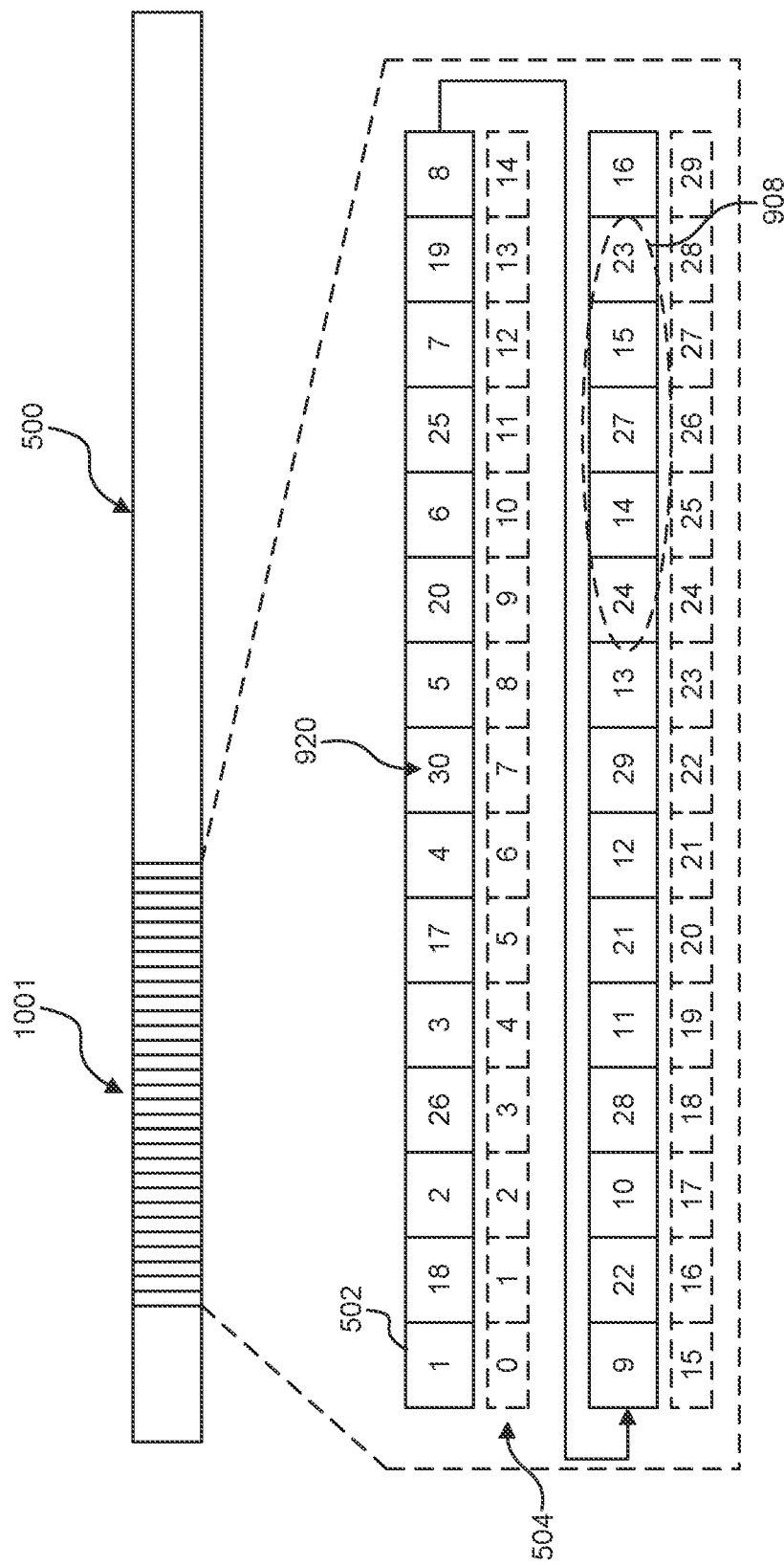
FIG. 10 is another schematic diagram of the HMB memory address range, according to some embodiments.

FIG. 10 illustrates a schematic diagram of a host memory buffer (HMB) memory address range 500, according to some embodiments. FIG. 10 also illustrates a Merkle tree memory address range 1001 of the HMB memory address range 500. The Merkle tree memory address range 1001 is allocated for storage of the Merkle tree data. The Merkle tree memory address range 1001 may be a subset of the total range of memory addresses of the HMB 140.

The Merkle tree memory address range 1001 comprises a plurality of memory address sub-sets 502, as previously described with reference to the binary tree memory address range 501. Each memory address sub-set 502 represents a range of memory addresses at which node data of a node of the Merkle tree 900 is stored. The memory address sub-sets 502 are each labelled with the respective reference label 920 of the node of the Merkle tree 900 that is stored at the particular memory address sub-set 502 once the controller 108 has performed the computer-implemented method 1100 on each of the nodes of the Merkle tree 900. As the Merkle tree 900 comprises 30 nodes (excluding the root 902), the Merkle tree memory address range 1001 comprises 30 memory address sub-sets 502.

Each memory address sub-set 502 is associated with an index value 504. The index value 504 of a memory address sub-set 502 is indicative of a relative position of the memory address sub-set 502 within the Merkle tree memory address range 1001. For example, the memory addresses of a memory address sub-set 502 that is associated with a higher index value are greater than the memory addresses of a memory address sub-set 502 that is associated with a lower index value. The Merkle tree memory address range 1001 is segmented into a number of memory address sub-sets 502. The number of memory address sub-sets 502 is equal to the number of nodes of the Merkle tree 900 (excluding the root node 902). In some embodiments, each of the memory address sub-sets 502 comprises the same number of memory addresses.

As previously mentioned, the controller 108 determines the memory addresses at which the node data of each node of the Merkle tree 900 is to be stored using the node position vector of the relevant node as an input of the Merkle tree memory assignment function. By doing so, the controller 108 stores the node data of each node at a memory address or a memory address range that is between the memory address or range of memory addresses at which its nephew nodes are stored.

For example, the second node 912B of the second layer 906C is an uncle node of the first node 916A of the third layer 906D and the second node 916B of the third layer 906D. The second node 912B of the second layer 906C is labelled, in FIG. 9, with a reference label 920 of 27. The first node 916A of the third layer 906D is labelled, in FIG. 9, with a reference label 920 of 24. The second node 916B of the third layer 906D is labelled, in FIG. 9, with a reference label 920 of 23. Referring to the HMB memory address range 500 of FIG. 10, it can be seen that the second node 912B of the second layer 906C is stored at a memory address sub-set 502 of the Merkle tree memory address range 1001 that is between the memory address sub-set 502 of the Merkle tree memory address range 1001 at which the first node 916A of the third layer 906D is stored and the memory address sub-set 502 of the Merkle tree memory address range 1001 at which the second node 916B of the third layer 906D is stored (as indicated by 908).

Thus, the controller 108, by performing the computer-implemented method 1100 on the Merkle tree 900, stores the Merkle tree data of the Merkle tree 900 in the HMB 140. The controller 108 stores the Merkle tree data such that a first nephew node memory address storing at least a part of the first nephew node data of a first nephew node of an uncle node is less than an uncle node memory address storing at least a part of the uncle node data of the uncle node; and a second nephew node memory address storing at least a part of the second nephew node data of a second nephew node of the uncle node is greater than the uncle node memory address. The controller 108 stores the node data of the first set of uncle nodes in this way.

By performing the computer-implemented method 1100 on the Merkle tree 900, the controller 108 also stores the Merkle tree data such that a third nephew node memory address storing at least a part of the third nephew node data of a third nephew node of a second uncle node is greater than a second uncle node memory address storing at least a part of the second uncle node data of the second uncle node; and a fourth nephew node memory address storing at least a part of the fourth nephew node data of a fourth nephew node of the second uncle node is less than the uncle node memory address. The controller 108 stores the node data of the second set of uncle nodes in this way.

Therefore, in some cases, the first nephew node memory address is less than the uncle node memory address and the second nephew node memory address is greater than the uncle node memory address (i.e. for the first set of uncle nodes). In some cases, the first nephew node memory address is greater than the uncle node memory address and the second nephew node memory address is less than the uncle node memory address (i.e. for the second set of uncle nodes).

In the case of FIGS. 9 and 10, the first set of uncle nodes comprises, for example, the first node 908A of the first layer 906B and the second node 908B of the first layer 906B. In the case of FIGS. 9 and 10, the second set of uncle nodes comprises, for example, the first node 916A of the third layer 906D and the second node 916B of the third layer 906D.

The uncle node data is stored at a range of uncle node memory addresses that comprises the uncle node memory address. The first nephew node data is stored at a range of first nephew node memory addresses that comprises the first nephew node memory address. The second nephew node data is stored at a range of second nephew node memory addresses that comprises the second nephew node memory address.

In some embodiments, memory addresses of the range of first nephew node memory addresses are less than memory addresses of the range of uncle node memory addresses and memory addresses of the range of second nephew node memory addresses are greater than memory addresses of the range of uncle node memory addresses. In some embodiments, memory addresses of the range of first nephew node memory addresses are greater than memory addresses of the range of uncle node memory addresses and memory addresses of the range of second nephew node memory addresses are less than memory addresses of the range of uncle node memory addresses.

In some embodiments, the range of first nephew node memory addresses and the range of uncle node memory addresses form a consecutive range of memory addresses. In some embodiments, the range of second nephew node memory addresses and the range of uncle node memory addresses form a consecutive range of memory addresses.

In some embodiments, the uncle node data comprises data associated with a first level of a Merkle tree, the first nephew node data comprises data of associated with a second level of the Merkle tree and the second nephew node data comprises data associated with the second level of the Merkle tree.

Computer-Implemented Method 1100 Examples

A first example of the computer-implemented method 1100 is detailed below for illustrative purposes. This example illustrates how the controller 108 can perform the computer-implemented method 1100 to determine a memory address of the HMB 140 at which to store the seventh node 916G of the third layer 906D of the Merkle tree 900.

The controller 108 determines the node position vector $[i_1, i_2, \ldots, i_{k-1}, i_k]$ of the seventh node 916G of the third layer 906D of the Merkle tree 900. The layer position of the seventh node 916G of the third layer 906D ($i_k = i_3$) is 6 (determined by counting from 0 at the first node 916A of the third layer 906D). The parent node of the seventh node 916G of the third layer 906D is the fourth node 912D of the second layer 306C. The layer position of the fourth node 912D of the second layer 306C ($i_2$) is 3. The parent node of the fourth node 912D of the second layer 306C is the second node 908B of the first layer 906B. The layer position of the second node 908B of the first layer 906B ($i_1$) is 1. A first element of the node position vector of the seventh node 916G of the third layer 906D ($i_1$) is therefore 1. A second element of the node position vector of the seventh node 916G of the third layer 906D ($i_2$) is 3. A third element of the node position vector of the seventh node 916G of the third layer 906D ($i_3$) is 6. The node position vector of the seventh node 916G of the third layer 906D of the Merkle tree 900 is therefore [1, 3, 6].

The controller 108 uses the node position vector of the seventh node 916G of the third layer 906D as an input of the Merkle tree memory assignment function. In this case, the depth of the Merkle tree 900 is 4, so the Merkle tree memory assignment function is:

$$mt([1, 3, 6]) = \left[\sum_{j=0}^{2}(-1)^{i_j} \times 2^{4-j}\right] - (-1)^6 \times 2^1 + 1 - 2$$

The controller 108 solves the Merkle tree memory assignment function as detailed below.

$mt([1,3,6]) = [(-1)^0 \times 2^4 + (-1)^1 \times 2^{4-1} + (-1)^3 \times 2^2] - (-1)^6 \times 2^1 + 1 - 2$ $mt([1,3,6]) = (16-8-4)-1+1-2$ $mt([1,3,6]) = 1$ The controller 108 therefore stores the node data of the seventh node 916G of the third layer 906D of the Merkle tree 900 at the first memory address sub-set 502 of the Merkle tree memory address range 1001 (i.e. the memory address sub-set 502 associated with the index number 1). This is also illustrated in FIG. 10, which shows the node data for the seventh node 916G of the third layer 906D being stored at the memory address sub-set 502 of the Merkle tree memory address range 1001 that is associate with the index number 1.

Advantages of the Computer-Implemented Method 1100

The computer-implemented method 1100 enables the node data of each uncle node of the Merkle tree 900 to be stored at a memory address or a memory address range of the HMB 140 that is between the memory addresses or memory address ranges of the uncle node's nephew nodes.

Storing the Merkle tree data in accordance with the computer-implemented method 1100 enables larger amounts of the Merkle tree data to be fetched in one read transaction and/or a smaller number of read transactions. Where a particular nephew node is required by the controller 108, it is also likely that the uncle node of that nephew node will be required. In cases where the nephew nodes under consideration are leaf nodes of the Merkle tree 300, node data of the uncle node and the nephew nodes will be stored at consecutive memory addresses, with the node data of the uncle node being stored at memory addresses between those at which the node data of the nephew nodes is stored. Therefore, in these cases, the controller 108 can fetch the node data of the uncle node and the node data of the nephew nodes in one read transaction without needing to fetch any additional node data. As this can be done in a reduced number of operations, the computer-implemented method 1100 decreases the latency involved in reading nodes of a Merkle tree. Furthermore, the bandwidth requirements of the communications network 118 are reduced as the controller 108 fetches less unnecessary node data than would be the case if the node data were stored less efficiently.

In cases where the nephew nodes under consideration are not leaf nodes of the Merkle tree 800, 900, node data of a particular uncle node and the associated nephew nodes will be not necessarily be stored at consecutive memory addresses; however, the node data of the uncle node is still stored at memory addresses between those at which the node data of the nephew nodes are stored. Therefore, in some cases, the controller 108 can fetch the node data of the uncle node and the node data of the nephew nodes in one read transaction whilst minimizing the node data of any intermediate nodes that needs to be fetched (i.e. nodes for which the node data is stored at memory addresses between the memory addresses at which the node data of a nephew node and the uncle node is stored).

In some embodiments, the data storage device 106 interacts with the host device 104 using a PCIe bus or another communications network 118. In most types of communication, such as PCIe-based data transfer, it is more efficient to transfer a single packet of a relatively larger size than a larger number of smaller packets that sum to the larger size. Storing the Merkle tree data in the HMB 140 as described therefore improves later fetching and/or reading of the Merkle tree data. For example, the latency involved with fetching and/or reading some or all of the Merkle tree data is reduced as larger portions of the Merkle tree data can be fetched per transaction. Furthermore, as described above, the node data can be fetched more efficiently due to the particular order in which the node data of particular nodes is stored. This reduces the amount of node data that needs to be discarded for being associated with nodes not required by the controller 108 when fetching a particular node.

Furthermore, storing the Merkle tree data in the HMB 140 as described also improves the data storage device's 106 performance with respect to writing new data to the HMB 140. For example, where the data storage device 106 would like to write new data to be associated with one or more related nodes of the Merkle tree 900 (e.g. an uncle node and its nephew nodes), this can be done in less (e.g. one) transaction between the data storage device 106 and the HMB 140.

An example of this optimization is detailed below, with reference to FIGS. 9 and 10. If the controller 108 requires the data block 922P, the controller 108 is required to fetch the node data of the sixteenth node 923P of the fourth layer 906E (the node with reference label 1 in FIG. 9), the seventh node 916G of the third layer 906D (the node with reference label 18 in FIG. 9), the third node 912C of the second layer 906C (the node with reference label 26 in FIG. 9) and the first node 908A of the first layer 906B (the node with reference label 30 in FIG. 9).

The controller 108 may fetch these nodes in one of a number of methods. According to a first method of fetching node data, the controller 108 fetches eight nodes in one transaction, starting from the node stored at the memory addresses of the Merkle tree memory address range 1001 associated with an index value of 0. In a general form, the first method comprises fetching all of the required nodes in a single transaction. Doing so in this case, the controller 108 would fetch nodes with reference labels 1, 18, 2, 26, 3, 17, 4 and 30 from the HMB 140. Since the only nodes needed are those with reference labels 1, 18, 26 and 30, the controller 108 can drop the other nodes (the nodes with reference labels 2, 3, 17 and 4).

According to a second method of fetching node data, the controller 108 issues two read transactions toward the HMB 140 for fetching the required nodes. A first read transaction fetches three nodes starting from a node stored at the memory addresses of the Merkle tree memory address range 1001 associated with an index value of 1 (i.e. the node with reference label 18). The first read transaction therefore fetches the nodes with reference labels 18, 2 and 26. The second read transaction fetches only the node stored at the memory addresses of the Merkle tree memory address range 1001 associated with an index value of 7 (i.e. the node with reference label 30). In this case, the controller 108 has optimized its selection of nodes so that no nodes are dropped.

The table below shows a comparison of the first method of fetching node data and the second method of fetching node data, when used by the controller 108 to fetch the required node data to authenticate particular data blocks.

| Data block required by the controller 108 | Reference label of the nodes that comprise required node data | Number of fetch transactions | | Number of dropped nodes | |
|---|---|---|---|---|---|
| | | First method | Second method | First method | Second method |
| 922P | 2, 18, 26, 30 | 1 | 2 | 3 | 0 |
| 922O | 1, 18, 26, 30 | 1 | 2 | 4 | 1 |
| 922N | 4, 17, 26, 30 | 1 | 1 | 1 | 1 |
| 922M | 3, 17, 26, 30 | 1 | 1 | 1 | 1 |
| 922L | 6, 20, 25, 30 | 1 | 1 | 1 | 1 |
| 922K | 5, 20, 25, 30 | 1 | 1 | 1 | 1 |
| 922J | 8, 19, 25, 30 | 1 | 2 | 4 | 1 |
| 922I | 7, 19, 25, 30 | 1 | 2 | 3 | 0 |

The first of fetching node data improves performance of the storage system 100 in cases where the bandwidth of the communications networks 118 between the data storage device 106 and the host device 104 is not a system bottleneck. For example, in consumer solid state drive (SSD) and gaming applications, there may be 2 or 4 communications channels across which the controller 108 can communicate with the non-volatile memory 110. These communications channels may be NOT-AND (NAND) channels. In these cases, the communications network 118 that the data storage device 106 uses to communicate with the host may have a higher bandwidth than the communications channels across which the controller 108 can communicate with the non-volatile memory 110. Cases such as this may be referred to as NAND-limited cases.

In these cases, reducing the number of read transactions provides for reduced system latency with minimal detriment to the performance of the storage system 100. As the communications channels across which the controller 108 can communicate with the non-volatile memory 110 is the bottleneck rather than the bandwidth of the communications network 118 or the host DRAM 138, even though some unnecessary nodes may be fetched in the read transaction, these can be discarded with minimal detriment to the operation of the storage system 100.

The second method of fetching data improves performance of the storage system in cases where the bandwidth of the host DRAM 138 and/or the communications network 118 is a bottleneck of the storage system 100. This is because the second method reduces the amount of data transferred between the host DRAM 138 and the data storage device 106. The second method may be beneficial in an enterprise context. Enterprise data storage devices 106 can have 8 or 16 communications channels across which the controller 108 can communicate with the non-volatile memory 110 (i.e. 10 or 16 NAND channels). In cases such as this, the bandwidth of the host DRAM 138 and/or the communications network 118 may be a bottleneck of the storage system 100 and selectively fetching node data to reduce this bandwidth requirement can result in improved system performance.

In some embodiments, the controller 108 automatically performs the best approach of the first method and the second method based on a current state of the storage system 100 (e.g. based on an average latency of communication between the data storage device 106 and the host device 104).

Derivation of the Merkle Tree Memory Assignment Function

The derivation of the Merkle tree memory assignment function is detailed below. As previously described, the computer-implemented method 1100 uses the node position vectors of each of the nodes of the Merkle tree 800, 900 as inputs to the Merkle tree memory assignment function. This enables each uncle node of the Merkle tree to be stored in the HMB 140 between the nephew nodes that are associated with the relevant uncle node.

As each uncle node is stored between its two nephew nodes, an initial form of the Merkle tree memory assignment function can be represented as:

$$mt([i_1,i_2, \ldots ,i_{k-1},i_k])=mt([i_1,i_2, \ldots ,1-i_{k-1}])-(-1)^{i_k}2^{d-k}$$

Explicitly:

$$mt(\text{root})=2^d-1$$

$$mt([i_1])=mt(\text{root})-(-1)^{i_1}2^{d-1}$$

$$mt([i_1,i_2])=mt([1-i_1])-(-1)^{i_2}2^{d-2}$$

$$mt([i_1,i_2,i_3])=mt([i_1,1-i_2])-(-1)^{i_3}2^{d-3}$$

The initial form of the Merkle tree memory assignment function can be generalized as:

$$mt([i_1, i_2, \ldots , i_{k-1}, i_k]) = 2^d - 1 + \sum_{j=1}^{k-1}(-1)^{i_j}2^{d-j} - (-1)^{i_k}2^{d-k}$$

By setting a dummy coordinate $i_0=0$, the generalized form of the initial form of the Merkle tree memory assignment function can be rewritten as:

$$mt([i_1, i_2, \ldots , i_{k-1}, i_k]) = \sum_{j=0}^{k-1}(-1)^{i_j}2^{d-j} - (-1)^{i_k}2^{d-k} - 1$$

By noting that the root node is not a part of the Merkle tree that is desired to be stored, every entry to the left of $2^d-1$ can be reduced by 1. This is dependent on the value of $i_1$ and the value of the level k. For k=1:

$$mt([0])=2^{d-1}-1, mt([1])=3 \cdot 2^{d-1}-2$$

For k>1, if $i_1=0$, then the generalized form of the initial form of the Merkle tree memory assignment function $>2^d-1$. If $i_1=1$, then the generalized form of the initial form of the Merkle tree memory assignment function $<2^d-1$. The Merkle tree memory assignment function can therefore be adapted to:

$$mt([i_1, i_2, \ldots , i_{k-1}, i_k]) = \sum_{j=0}^{k-1}(-1)^{i_j}2^{d-j} - (-1)^{i_k}2^{d-k} + \begin{cases} -i_1 - 1, k = 1 \\ i_1 - 2, k > 1 \end{cases}$$

A total size of the tree which is stored in the HMB 140 is $2^{d+1}-2$.

Alternative Tree Data Structure Terminology

For the purposes of this description, the layer of a tree data structure that comprises the root node of the tree data structure is the highest layer of the tree data structure. For example, the layer of the binary tree 300 that comprises the root node 302 is the highest layer of the binary tree 300. Similarly, the layer of the Merkle tree 800, 900 that comprises the root node 802, 902 is the highest layer of the Merkle tree 800, 900. The layer of a tree data structure that comprises the child nodes of the root node is considered a lower layer of the tree data structure than the layer of the tree data structure that comprises the root node, and a higher layer of the tree data structure than the layer of the tree data structure that comprises the child nodes of the child nodes of the root node. This convention can be iterated throughout the depth of the relevant tree data structure.

It is understood that while this terminology is used to assist with distinguishing between different layers of tree data structures such as the binary tree 300 and the Merkle tree 800, 900, in some embodiments, this terminology may be inverted without departing from the scope of the description. That is, in some embodiments, the layer of a tree data structure that comprises the root node is a lowest layer of the tree data structure. In these embodiments, the layer of the tree data structure that comprises the child nodes of the root node is considered a higher layer of the tree data structure than the layer of the tree data structure that comprises the root node, and a lower layer of the tree data structure than the layer of the tree data structure that comprises the child nodes of the child nodes of the root node.

Similarly, for the purposes of this description, the layer of a tree data structure that comprises the root node of the tree data structure is described as the zeroth layer of the tree data structure. The layer of a tree data structure that comprises the child nodes of the root node is considered the first layer of the tree data structure. The layer of a tree data structure that comprises the child nodes of the nodes of the first layer is considered the second layer. This convention can be iterated throughout the depth of the relevant tree data structure. It is understood that while this terminology is used to assist with distinguishing between different layers of tree data structures such as the binary tree 300 and the Merkle tree 800, 900, in some embodiments, the layers of the tree data structure may be enumerated differently.

For example, in some embodiments, the layer of a tree data structure that comprises the root node of the tree data structure is a first layer of the tree data structure. In these embodiments, the layer of the tree data structure that comprises the child nodes of the root node is a second layer of the tree data structure and the layer of the tree data structure that comprises the child nodes of the nodes of the second layer is a third layer of the tree data structure. This convention can be iterated throughout the depth of the relevant tree data structure.

In some embodiments, the layer of a tree data structure that comprises the root node of the tree data structure is the nth layer of the tree data structure. In these embodiments, n can correspond to the depth of the tree data structure (in which case the lowest layer of the tree is the zeroth layer). Alternatively, n can correspond to one more than the depth of the tree (in which case the lowest layer of the tree is the first layer).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for storing binary tree data in a random access memory comprised of memory cells associated with corresponding memory addresses, wherein the binary tree data comprises parent node data, first child node data and second child node data, the computer-implemented method comprising:

determining a first child node memory address using a processor to execute a memory assignment function based on a first node position vector for a first child node, the first child node memory address being less than a parent node memory address;

determining a second child node memory address using the processor to execute the memory assignment function based on a second node position vector for a second child node, the second child node memory address being greater than the parent node memory address;

storing the parent node data in at least one memory cell at the parent node memory address;

storing the first child node data in at least one memory cell at the first child node memory address; and storing the second child node data in at least one memory cell at the second child node memory address, wherein the first node position vector and the second node position vector are each represented by $[i_1, i_2, \ldots, i_{k-1}, i_k]$, where:

$i_1$ is a layer position of a direct relative of that node in a first layer of the binary tree;

$i_2$ is a layer position of a direct relative of that node in a second layer of the binary tree;

$i_{k-1}$ is a layer position of a parent node; and $i_k$ is a layer position of that node.

2. The computer-implemented method of claim 1, further comprising determining the parent node memory address using the processor to execute the memory assignment function.

3. The computer-implemented method of claim 1, wherein:

storing the parent node data at the parent node memory address comprises storing a part of the parent node data at the parent node memory address, storing the first child node data at the first child node memory address comprises storing a part of the first child node data at the first child node memory address, and storing the second child node data at the second child node memory address comprises storing a part of the second child node data at the second child node memory address.

4. The computer-implemented method of claim 1, wherein:

the parent node data comprises data associated with a first level of a binary tree, the first child node data comprises data associated with a second level of the binary tree, and the second child node data comprises data associated with the second level of the binary tree.

5. The computer-implemented method of claim 1, wherein:

storing the parent node data at the parent node memory address is performed before storing the first child node data at the first child node memory address, and storing the parent node data at the parent node memory address is performed before storing the second child node data at the second child node memory address.

6. The computer-implemented method of claim 1, wherein:

storing the first child node data at the first child node memory address is performed before storing the parent node data at the parent node memory address, and storing the first child node data at the first child node memory address is performed before storing the second child node data at the second child node memory address.

7. The computer-implemented method of claim 1, wherein:

storing the second child node data at the second child node memory address is performed before storing the parent node data at the parent node memory address, and storing the second child node data at the second child node memory address is performed before storing the first child node data at the first child node memory address.

8. The computer-implemented method of claim 1, wherein the binary tree data comprises first child tree data comprising at least the first child node data, and second child tree data comprising at least the second child node data, the computer-implemented method further comprising:

storing the first child tree data at memory addresses within a range of first tree memory addresses that comprises the first child node memory address, the memory addresses of the range of first tree memory addresses being less than the parent node memory address; and storing the second child tree data at memory addresses within a range of second tree memory addresses that comprises the second child node memory address, the memory addresses of the range of second tree memory addresses being greater than the parent node memory address.

9. The computer-implemented method of claim 1, wherein the memory assignment function is configured to determine a target node memory address indicator $bt([i_1, i_2, \ldots, i_{k-1}, i_k])$ by calculating:

$$bt([i_1, i_2, \ldots, i_{k-1}, i_k]) = -1 - \sum_{j=0}^{k} (-1)^{i_j} 2^{d-j}$$

where:

$i_0 = 1$; and d is a depth indicator that is indicative of a depth of the binary tree.

10. The computer-implemented method of claim 1, further comprising:

storing the parent node data at a range of parent node memory addresses that comprises the parent node memory address;

storing the first child node data at a range of first child node memory addresses that comprises the first child node memory address; and storing the second child node data at a range of second child node memory addresses that comprises the second child node memory address.

11. The computer-implemented method of claim 10, wherein memory addresses of the range of first child node memory addresses are less than memory addresses of the range of parent node memory addresses, and memory addresses of the range of second child node memory addresses are greater than memory addresses of the range of parent node memory addresses.

12. The computer-implemented method of claim 10, wherein:

the range of first child node memory addresses and the range of parent node memory addresses form a first consecutive range of memory addresses; and the range of parent node memory addresses and the range of second child node memory addresses form a second consecutive range of memory addresses.

13. An apparatus for storing binary tree data, the apparatus comprising:

a random access memory comprised of memory cells associated with corresponding memory addresses, wherein the binary tree data comprises parent node data, first child node data and second child node data; and a processor configured to:
determine, using a memory assignment function and based on a first node position vector for a first child node, a first child node memory address, the first child node memory address being less than a parent node memory address;
determine, using the memory assignment function and based on a second node position vector for a second child node, a second child node memory address, the second child node memory address being greater than the parent node memory address;
store the parent node data in at least one memory cell at the parent node memory address;
store the first child node data in at least one memory cell at the first child node memory address; and
store the second child node data in at least one memory cell at the second child node memory address, wherein the first node position vector and the second node position vector are each represented by $[i_1, i_2, \ldots, i_{k-1}, i_k]$, where:
$i_1$ is a layer position of a direct relative of that node in a first layer of the binary tree;
$i_2$ is a layer position of a direct relative of that node in a second layer of the binary tree;
$i_{k-1}$ is a layer position of a parent node; and
$i_k$ is a layer position of that node.

14. An apparatus for storing binary tree data, the apparatus comprising:
a random access memory comprised of memory cells associated with corresponding memory addresses, wherein the binary tree data comprising parent node data, first child node data and second child node data;
means for determining, using a memory assignment function and based on a first node position vector for a first child node, a first child node memory address, the first child node memory address being less than a parent node memory address;
means for determining, using the memory assignment function and based on a second node position vector for a second child node, a second child node memory address, the second child node memory address being greater than the parent node memory address;
means for storing the parent node data in at least one memory cell at the parent node memory address;
means for storing the first child node data in at least one memory cell at the first child node memory address; and
means for storing the second child node data in at least one memory cell at the second child node memory address, wherein the first node position vector and the second node position vector are each represented by $[i_1, i_2, \ldots, i_{k-1}, i_k]$, where:
$i_1$ is a layer position of a direct relative of that node in a first layer of the binary tree;
$i_2$ is a layer position of a direct relative of that node in a second layer of the binary tree;
$i_{k-1}$ is a layer position of a parent node; and
$i_k$ is a layer position of that node.

15. The apparatus of claim 13, wherein the memory assignment function is configured to determine a node memory address indicator $bt([i_1, i_2, i_{k-1}, i_k])$ by calculating:

$$bt([i_1, i_2, \ldots, i_{k-1}, i_k]) = -1 - \sum_{j=0}^{k} (-1)^{i_j} 2^{d-j}$$

where:
$i_0 = 1$; and
d is a depth indicator that is indicative of a depth of the binary tree.

16. The apparatus of claim 13, wherein:
the parent node data comprises data associated with a first level of a binary tree,
the first child node data comprises data associated with a second level of the binary tree, and
the second child node data comprises data associated with the second level of the binary tree.

17. The apparatus of claim 13, wherein:
the parent node data is stored at a range of parent node memory addresses that comprises the parent node memory address,
the first child node data is stored at a range of first child node memory addresses that comprises the first child node memory address, and
the second child node data is stored at a range of second child node memory addresses that comprises the second child node memory address.

18. The apparatus of claim 17, wherein
memory addresses of the range of first child node memory addresses are less than memory addresses of the range of parent node memory addresses, and
memory addresses of the range of second child node memory addresses are greater than memory addresses of the range of parent node memory addresses.

19. The apparatus of claim 17, wherein:
the range of first child node memory addresses and the range of parent node memory addresses form a first consecutive range of memory addresses; and
the range of parent node memory addresses and the range of second child node memory addresses form a second consecutive range of memory addresses.

20. The apparatus of claim 13, wherein:
storing the parent node data at the parent node memory address comprises storing a part of the parent node data at the parent node memory address;
storing the first child node data at the first child node memory address comprises storing a part of the first child node data at the first child node memory address; and
storing the second child node data at the second child node memory address comprises storing a part of the second child node data at the second child node memory address.

* * * * *